(12) United States Patent
Usuda

(10) Patent No.: US 7,380,206 B1
(45) Date of Patent: May 27, 2008

(54) DATA DISTRIBUTION METHOD AND APPARATUS, AND DATA RECEPTION METHOD AND APPARATUS

(75) Inventor: Hiroshi Usuda, Ibaraki (JP)

(73) Assignee: Sony Corporation (JP)

( * ) Notice: Subject to any disclaimer, the term of this patent is extended or adjusted under 35 U.S.C. 154(b) by 624 days.

(21) Appl. No.: 09/856,039

(22) PCT Filed: Sep. 18, 2000

(86) PCT No.: PCT/JP00/06357

§ 371 (c)(1),
(2), (4) Date: Aug. 3, 2001

(87) PCT Pub. No.: WO01/22631

PCT Pub. Date: Mar. 29, 2001

(30) Foreign Application Priority Data

Sep. 17, 1999 (JP) .................. P11-263761

(51) Int. Cl.
G06F 17/00 (2006.01)
G06F 15/00 (2006.01)

(52) U.S. Cl. .............. 715/236; 715/234; 715/235; 715/201; 715/202

(58) Field of Classification Search ............. 715/522, 715/530, 513, 201, 202, 234–6
See application file for complete search history.

(56) References Cited

U.S. PATENT DOCUMENTS 5,860,073 A * 1/1999 Ferrel et al. ............... 715/522
5,899,975 A    5/1999 Nielsen
6,023,714 A * 2/2000 Hill et al. .................. 715/513
6,026,232 A * 2/2000 Yogeshwar et al. ........ 715/719
6,219,731 B1 * 4/2001 Gutowitz .................... 710/67

(Continued)

FOREIGN PATENT DOCUMENTS

| EP | 0 908 832 A2 | 4/1999 |
| EP | 924594 A2 * | 6/1999 |
| GB | 2 329309 | 3/1999 |
| JP | 11-143874 | 5/1999 |
| JP | 11-175515 | 7/1999 |

OTHER PUBLICATIONS

Taizou Sueyasu, "WWW Style Gengo no Shin Hyoujun: Hyougenryoku no Oohabana Koujou ga Kitai; XML you no Style Sheet Kikaku XSLno Saishin Draft", Nikkei Internet Technology, No. 15, Sep. 1998, p. 18.

Warner ten Kate, et al., "Presenting Multimedia on the Web and in TV Broadcast", Lect Notes Comput Sci, vol. 1425, p. 56-69.

(Continued)

Primary Examiner—Doug Hutton
Assistant Examiner—N Hillery
(74) Attorney, Agent, or Firm—Lerner, David, Littenberg, Krumholz & Mentlik, LLP

(57) ABSTRACT

Information matching output attributes and/or content attributes is contained in a single data content for distribution and is divided by tags for separation during processing. The expression format is prescribed by style sheets, so that the receiving system side selectively stores style sheets matching the content attributes of the distribution content or matching the output attributes of the output apparatus.

51 Claims, 15 Drawing Sheets

U.S. PATENT DOCUMENTS

| | | | | |
|---|---|---|---|---|
| 6,460,180 B1 * | 10/2002 | Park et al. | | 725/40 |
| 6,463,440 B1 * | 10/2002 | Hind et al. | | 707/102 |
| 6,477,549 B1 * | 11/2002 | Hishida et al. | | 715/513 |
| 6,505,160 B1 * | 1/2003 | Levy et al. | | 704/270 |
| 6,675,385 B1 * | 1/2004 | Wang | | 725/39 |
| 6,879,720 B2 * | 4/2005 | Sarachik et al. | | 382/199 |
| 2001/0011287 A1 * | 8/2001 | Goto et al. | | 707/513 |

OTHER PUBLICATIONS

Bickmore et al., "Digestor: device-independent access to the World Wide Web", Computer Networks and ISDN Systems 29 ( 1997) 1075-1082.

Kawabata et al., "The Use of XML in Component Oriented OpS", NTT Optical Network Systems Laboratories, pp. 25-30.

* cited by examiner

FIG. 4

| RESOURCE LOCATION INFORMATION |
| :---: |
| DISPLAY/OUTPUT CONTROL PROGRAM (MULTIMEDIA CODING APPLICATION) (XML INSTANCE) |
| SCRIPT (JavaScript, ECMAScript, Jscript AND THE LIKE) |
| VOICE DATA (AIFF, WAV, AAC AND THE LIKE) |
| STILL-PICTURE DATA (JPEG, PNG, GIF AND THE LIKE) |
| ANIMATION DATA (MPEG AND THE LIKE) |
| ⋮ |

FIG. 11 if(0<contents_id<3)
xsl_file=BS-type1.xsl if(3≤contents_id<5)
xsl_file=BS-type2.xsl if(5≤contents_id<6)
xsl_file=BS-type3.xsl if(6≤contents_id<7)
xsl_file=BS-type4.xsl if(7≤contents_id)
xsl_file=BS-type5.xsl

FIG. 13

DATA BROADCAST CONTENT
(XML INSTANCE)

XML INSTANCE FOR DISPLAY TYPE #1

XML INSTANCE FOR DISPLAY TYPE #2

XML INSTANCE FOR DISPLAY TYPE #3

STYLE SHEET

<u>XSL DOCUMENT</u>

(DEFINING TRANSCRIPTION SPECIALIZED IN THE DISPLAY OF HDTV)

<u>JAVA SCRIPT</u>

DEFINING PROCESS FOR DISPLAY OTHER THAN HDTV WITH IF STATEMENT AND THE LIKE)

```
if(display_type=SDTV)    .........
if(display_type=SXGA)    .........
if(display_type=XGA)     .........
if(display_type=SVGA)    .........
if(display_type=VGA)     .........
```

DATA DISTRIBUTION METHOD AND APPARATUS, AND DATA RECEPTION METHOD AND APPARATUS

BACKGROUND OF INVENTION

1. Technical Field

The present invention relates to digital data distribution, such as a digital satellite broadcast or other multimedia content communication, and in particular to distributing digital data comprised of computer language commands defining data attributes. The computer language commands are represented, for example, in the form of data that is divided by tags that define the data attribute, known as a "markup language".

Further, the present invention relates to the distributing of data content in a language that uses arbitrarily definable tags, such as XML (eXtensible Markup Language), within the data broadcast and to the receiving and displaying of the content. In particular, the invention relates to the distributing and selecting of style sheets for prescribing the expression format of XML instances or XSL (eXtensible Style sheet Language) documents.

2. Background Art

In the field of broadcasting, the use of digital data is rapidly growing. Digital signals are superior to analog signals because of their stability and the higher compressibility of the data. Further, digital signals, whether sent over a cable, a ground wave or a satellite wave, provide more channels than analog signals for certain bands. In addition, though various information, such as documents, voice data and picture data are separated in a conventional transmission, the digitized broadcast data enables transmission of these monomedia data types indiscriminately.

For example, using a digital broadcast, improved service is provided to users (i.e., viewers) by sending EPG (Electric Program Guide) and other system information as part of the data broadcast content together with the image and voice information. The EPG may include the capability of video recording, in addition to providing a broadcast schedule, a name of broadcast programs and other information.

Data delivered in a digital format has a high compatibility with general-purpose computer systems and with other non-television information equipment. For example, a general-purpose computer system may be equipped with a tuner card for satellite broadcasts to parse the EPG data received in the computer, process the same for display, and display program tables and other menu screens in a window. Using such a menu screen, it is possible to switch programs and reserve video recordings by moving a mouse controlled cursor or using a touch panel. Moreover, it is possible to store the received data broadcast content on a hard disc, that is integrated with the computer, to be reproduced or reused.

Moreover, using a digital broadcast, it is possible to enhance the interaction of broadcast programs by taking advantage of the band used and by transmitting data other than the image and voice broadcast programs. For example, in a broadcast program in which true-false quizzes are given, the transmission of answers as well as image and voice data enables the satellite TV broadcast receivers (i.e., viewers) to use answer menu buttons on the computer display and to check the answers by means of the mouse cursor or the touch panel.

When the interaction is further enhanced, home TV receivers may play an active role as an information controller to handle more than image content. For example, a TV receiver may serve as an Internet terminal or as an electronic commerce terminal.

In Japan, the ARIB (Association of Radio Industries and Businesses) is playing a central role in promoting standardization of the digital satellite data broadcast. Using the digital satellite broadcast, digital transfer data supplementary to the broadcast program is distributed, in addition to the image and voice data constituting the main body of the broadcast program (AV data). More specifically, data is transmitted as broadcast waves in the form of a transport stream obtained by multiplexing the AV data compressed by a specified compression method, such as the MPEG (Motion Picture Experts Group) 2 format, with digital transfer data.

An example of broadcast program information transmitted as data broadcast content is the aforementioned EPG (Electric Program Guide). Information inherent to the main body of the broadcast program may be included, such as the title and date of the broadcast program as well as the program casting. The types of and the construction of the data contained in the broadcast program information are systematized to some extent in accordance with the service content provided by the main body of the program. For example, information related to recipes and food materials may be delivered with a cooking program, the number of votes cast may be obtained and renewed constantly and then delivered in a real-time report of election returns, and the individual batting and pitching records of various players and the team rankings may be delivered with a professional baseball game broadcast.

Broadcast program information is typically displayed using part of the same display screen of the receiving system that displays the main body of the broadcast program. The receiving system typically includes a receiver for receiving, tuning and decoding the broadcast wave, such as a set top box (STB) and a television (TV) set for displaying/outputting the broadcast. The receiving system is typically installed in the home of a viewer.

The construction of content distributed as digital broadcast data, hereinafter referred to as "data broadcast content", is explained by referring to FIG. 1.

As shown in FIG. 1, the data broadcast content consists of a large variety of monomedia data including text data, still pictures, animation images, voice data, etc., as well as a display and output control program that prescribes the state of broadcast program information by handling integrally each of the monomedia data or multimedia data, generally referred to as a multimedia coding application. It is possible to integrate information corresponding to the monomedia information to the display output control program.

As part of the standardization of the digital satellite data broadcast undertaken by the aforementioned ARIB, a first attempt at a format for describing the multimedia coding applications of data broadcast content used MHEG (Multimedia and Hypermedia Expert Group). MHEG is a descriptive language that defines data attributes and displays multimedia content on TVs and which is designed to allow viewers to obtain their desired information from Video On Demand (VOD) or digital TV broadcast. MHEG-5 is already used in the Japanese CS (Communication Satellite) digital broadcast known as SKY Perfect TV.

MHEG, however, uses a fixed coding space and lacks extensibility. In other words, a unilaterally fixed coding space must be used to describe a change of a single function. For example, an API (Application Programming Interface) requires a considerable amount of correction work. In addition, MHEG is generally not well known, and thus data content written in MHEG is not circulated in a sufficient quantity. In this sense, MHEG has a relatively low applicability for general-purpose computers.

As a result, the ARIB is examining standardization based on XML (eXtensible Markup Language) in place of MHEG. More specifically, work is progressing in dividing content into "basic XML", also referred to as BML ("Broadcast Markup Language"), and "advanced XML", an extended version of the basic XML.

XML allows for the optional definition of tags and has no restrictions on the way attributes are described. XML therefore allows a high degree of freedom and its high applicability in general-purpose computers and the Internet provides advantages over MHEG. Furthermore, XML is now being developed as a descriptive language for the next generation of the Internet.

When XML is used as the standard language of data broadcast content, it is possible to exchange data for digital broadcast among a variety of information equipment, such as computers, TVs, telephones, etc. In addition, as XML can be used to freely define tag attributes, it is more suitable for data processing than HTML (Hyper Text Markup Language). Consequently, its use is rapidly expanding in various fields including electronic commerce.

Document files written in XML format are called "XML instances." The writing of attribute information (or tag grammar) is governed by a standard known as DTD (Document Type Definition). For example, a DTD may be established for every industry or for every service provided by each industry.

XML instances themselves do not always contain the style information on the form expressed, such as the form of the output to displays or the form of the output to printers, etc. In this case, the expression of the XML instances is described by a "style sheet" or a document file different from DTD.

The style sheet for XML instances can be written by using particular languages, such as in the form of XSL (eXtensible Style sheet Language), CSS (Cascade Style Sheet), XSLT (XSL Transformation) or a standard derived from the above-mentioned. Alternatively, a script may be inserted into a style sheet. A script is a method of executing software described in a text form in the same manner as ordinary source programs. A script is used to automate a series of processes resulting from the combination of operating procedures that users can control, such as specific keys or buttons, in an application or in an OS (Operating System).

Even when XML instances are the same, depending on the description in the style sheet concerned, the same XML instance may be expressed on the display screen in a completely different form by varying the font style, size or color. In other words, a style sheet has the function of providing added information to the original XML instance. It can be assumed that the importance of style sheets will grow in the future as more attractive style sheets are designed by specialized designers.

Style sheets can be transmitted in a file separate from that storing the XML instance. For example, XML instances may be distributed by data broadcast, whereas the style sheets may be distributed using other forms of distribution, for example, using portable recording media such as a CD (Compact Disc), an MO (Magneto-Optical) disc, a DVD (Digital Versatile Disc) or by file transfers through the Internet.

Meanwhile, the choice of display apparatus that can output the data broadcast content are becoming more diverse. For example, in addition to the conventional NTSC (National Television System Committee) color television systems, HDTV (High Definition Television) systems with many scanning lines for large screens, PDA (Personal Digital Assistant) devices with a monochrome liquid crystal display of a small screen size, and relatively high definition computer screens such as SVGA (Super Video Graphic Array) or XGA (eXtended Graphic Array) are under development.

Thus, though the data content may be the same, when the display capacity of the output device is different, the optimum form of the display is different. For example, a display format that is optimum for a high resolution, high definition HDTV is not necessarily appropriate for a low resolution, small screen PDA. As mentioned earlier, the format used for expressing content is defined by style sheets. Therefore, the style sheet that is appropriate for such content is determined by the display and output capacity and expression capacity of the display apparatus to which the data content is outputted.

Also, even when the resolution and other hardware capacity for the display apparatus are identical, the optimum format of display may differ depending on the manufacturer and the type of apparatus used.

In addition, depending on the attribute of data broadcast content, for example, depending on the data shown by the tags <POSITION>, <COLOR>, <SIZE>, etc., the optimum choice of style sheet may differ.

Further, the optimum style sheets or the style sheets most preferred by the receiving user are not always distributed together with the data broadcast content.

SUMMARY OF THE INVENTION

It is therefore an object of the present invention to provide a data distribution technology that provides documents in a language format in which arbitrarily definable tags are used, for example, XML (eXtensible Markup Language), that are matched with the output attributes and/or the content attributes.

Another object of the present invention is to provide a data distribution technology that provides content matched with each output attribute or content attribute when data is distributed via a broadcast or a network.

The present invention takes into account the above objects. According to an aspect of the invention, a data distributing method or apparatus for distributing content data written in a computer language includes combining a plurality of information with output attributes in a single data content and distributing the data content for distribution.

The data written in a computer language may be, for example, data in a language format using tags or data in a language format using arbitrarily definable tags. Such data may be an XML instance written in the XML (eXtensible Markup Language) format.

The information provided according to the output attributes may be data divided by tags.

If the data content is formed of instances written in mark-up languages such as XML, it is possible to prescribe their expression format, including the format of display by a display apparatus or the format outputted and printed by a printer using a document known as a "style sheet."

The style sheet may prescribe an expression format according to the output attributes. The output attributes may include the resolution, manufacturer's name, model, etc. of the display apparatus used to display the content data. In other words, it is possible to prepare in advance a large number of style sheets prescribing the optimum expression format for each output attribute, such as the resolution, manufacturer's name, model, etc. of the relevant display apparatus.

The style sheets may include scripts, i.e., a method executed by the software that is described in text form like ordinary source programs, to automate a series of processing or combining procedures such as specific keys and buttons that the end users can control in an application or an OS. The script may be described by an expression adapted to a plurality of output attributes.

According to another aspect of the invention, a data receiving method or apparatus for receiving content formed of data written in a computer language selects a style sheet matched with content identification information, and processes received data content using the selected style sheet.

The data may be written in a computer language as data in a format using tags or in a format using arbitrary definable tags, such as an XML instance written in the XML (eXtensible Markup Language) format.

When the distributed data content is formed of instances written in a mark up language such as XML, it is possible to prescribe their expression form by a document called a "style sheet."

The style sheet may prescribe an expression format matching the output attribute. The content identification information may represent the content attributes and is decided, for example, based on specified tag data in the XML instances, such as <POSITION>, <COLOR>, <SIZE>, etc. Thus, a large number of style sheets may be prepared in advance for prescribing the optimum expression format for each output attribute.

The style sheets may include scripts. The scripts may describe the expression format matching with a plurality of output attributes.

According to yet another aspect of the invention, a data receiving method or apparatus for receiving content formed of data that is written in a computer language and outputted by an output apparatus stores the output attribute information related to the output apparatus, selects a style sheet matching the stored output attribute information, and processes the received data content using a selected style sheet.

The data written in a computer language may be in a format in which tags are used or in a format using arbitrarily definable tags, such as an XML instance written in the XML (eXtensible Markup Language) format.

When the received data content are instances written in a mark up languages such as XML, the expression format may be defined by a "style sheet."

The style sheet may prescribe expression formats in accordance with the output attributes, such as the resolution, manufacturer's name, model, etc. of the display apparatus, in advance. A large number of style sheets may be prepared previously for prescribing the optimum expression format for each output attribute.

The style sheets may include scripts. The expression format that matches with a plurality of output attributes may be defined by a script.

The present aspect of the invention may include retrieving a style sheet on the network when a stored style sheet cannot be selected. Alternatively, a matching style sheet may be obtained using a portable recording medium when a stored style sheet cannot be selected.

According to still another aspect of the present invention, a data receiving method or apparatus for receiving content formed of data written in a computer language selects a style sheet that matches content identification information, and processes received data content using the selected style sheet.

The data written in a computer language may be in a language format that uses tags or in a language format that uses arbitrarily definable tags, such as an XML instance written in the XML (eXtensible Markup Language) format.

A style sheet may define expression forms adapted to the output attribute. The output attribute information may indicate the content attributes and may be determined based on specified tag data in the XML instances that form part of the content, such as <POSITION>, <COLOR>, <SIZE>, etc. A large number of style sheets that prescribe optimum expression forms for every content attribute may be defined in advance.

The style sheets may include scripts. Each script may define the expression operation for matching with a plurality of output attributes.

The present data receiving method or apparatus may retrieve a matching style sheet on the network, when a style sheet cannot be selected in the above manner. Alternatively, a matching style sheet may be obtained through a portable recording medium.

According to a further aspect of the invention, a data receiving method or apparatus for receiving content formed of data written in a computer language selects a style sheet that matches content identification information, retrieves style sheets matching the stored output attribute information from a style sheet server providing style sheets over a network, and processes the received data content using the retrieved style sheet.

According to a still further aspect of the invention, a style sheet providing method or a server providing style sheets through one or more networks stores one or more style sheets prescribing an expression format for each output attribute of various output apparatus, receives requests for style sheets in a format that includes information on output attributes, and extracts a style sheet matching with the output attribute specified in the request.

According to yet a further aspect of the invention, a data receiving method or apparatus for receiving content formed of data written in a computer language and outputted to an output apparatus stores content attributes related to the content received, retrieves style sheets matching the content attribute information from a style sheet server over a retrieved network, and processes the data content received using the retrieved style sheet.

According to an additional aspect of the invention, a style sheet providing method or a server for providing style sheets via a network stores one or more style sheets that prescribe an expression format for each content attribute, receives requests for style sheets having a format that includes information on content attributes, and extracts a style sheet matching the output attribute specified by the request.

According to yet an additional aspect of the invention, a data content processing system distributes, receives and processes content formed of data written in a computer language and outputs the same to an output apparatus. A plurality of information provided according to the content attributes and/or output attributes contained in a single data content is distributed. Output attributes information concerning the output apparatus and/or the content attributes concerning the received data content is stored. Style sheets matching the output attributes information and/or the content attributes stored are selected, and the data content received using the selected style sheet are processed.

According to a still additional aspect of the invention, a data content processing system distributes, receives and processes content formed of data written in a computer language and outputted to an output apparatus. A plurality of information provided in accordance with the content attributes and/or the output attributes contained in a single data content is distributed. The output attributes information concerning the output apparatus and/or the content attributes concerning the data content received is stored. Style sheets matching the output attribute information and/or the stored content attributes are requested. The data content received using the style sheets provided are processed. One or more style sheets prescribing the expression format for each output attribute and/or for each content attribute of each output apparatus is stored. Style sheets having formats containing information on the output attribute and/or on the content attribute are provided in response to requests.

According to a further additional aspect of the invention, a program recording medium records, in a tangible and computer-readable format, a computer program for executing, on a computer system, a data distribution process for distributing content formed of data written in a computer language. A plurality of information matching output attributes and/or content attributes are included in a single data content for distribution, and the data content is distributed.

According to a still further additional aspect of the invention, a program recording medium records, in a tangible and computer-readable format, a computer program for executing, on a computer system, a process of receiving content formed of data written in a computer language and outputted by an output apparatus. The computer program stores output attributes information concerning output apparatus and/or the content attributes of received content, selects style sheets matching stored output attributes and/or matching stored content attributes stored, and processes the received data content using the selected style sheets.

According to an added aspect of the invention, a program recording medium provides, in a tangible and computer-readable format, a computer program for executing, on a computer system, the process of providing style sheets supplied through a network. The computer program stores one or more style sheets prescribing an expression format of the output attributes of each output apparatus and of each content attribute for distribution, receives requests for the style sheets having a format which includes information on the output attributes and/or on the content attributes, and extracts and transmits style sheets matching the output attributes and/or the content attributes specified by the requests.

Information may be provided in accordance with the output attributes and the attributes of the data content that are to be provided. As a result, the distribution of content at data distributors, such as broadcast servers, is improved.

Because the information matching the output attributes and content attributes is divided by tags, each can be processed separately. Moreover, by selectively using style sheets, the format can be prepared in advance.

Upon receiving a single distribution data content that includes information matching the output attributes or the content attributes, the data can be converted into a specified expression format by selecting a style sheet matching the content received, and the date then can be displayed.

When one or more style sheets are supplied via a data broadcast, the Internet, a portable recording medium, or other various forms, an optimum style sheet that matches the output attributes of an output apparatus can be selectively stored. Thus, receiver/decoder users benefit from the content being displayed in a format optimized for the display apparatus.

The users may employ the user interface on their receiver/decoder to personally select a style sheet that matches the content distributed.

For a satellite or ground wave broadcast, information matching a plurality of output attributes and content attributes may be provided based on a single data broadcast content.

When the information is distributed over the Internet, the content is outputted in the optimum format determined by the output attributes or content attributes supplied through the input screen on the home page.

The program recording media may be, for example, a general-purpose system capable of executing various program codes and may be a detachable and portable recording medium such as a CD (Compact Disc), an FD (Floppy Disc) or an MO (Magneto-Optical disc).

Such recording media define a structurally or functionally synergetic relationship between certain computer programs and the recording media to realize the functions of computer programs on the computer system.

BRIEF DESCRIPTION OF THE DRAWINGS

FIG. 4 is a schematic diagram showing the structure of data stored in data modules within the digital transfer data.

FIG. 11 is a diagram showing an example of a determination logic configuration.

FIG. 13 is a schematic diagram showing a XML instances structure.

FIG. 14 is a diagram showing an example of output attribute and/or content attribute processing written in Java script.

DETAILED DESCRIPTION

An example of a structure of the present invention is explained with reference to the drawings.

Figure 1:
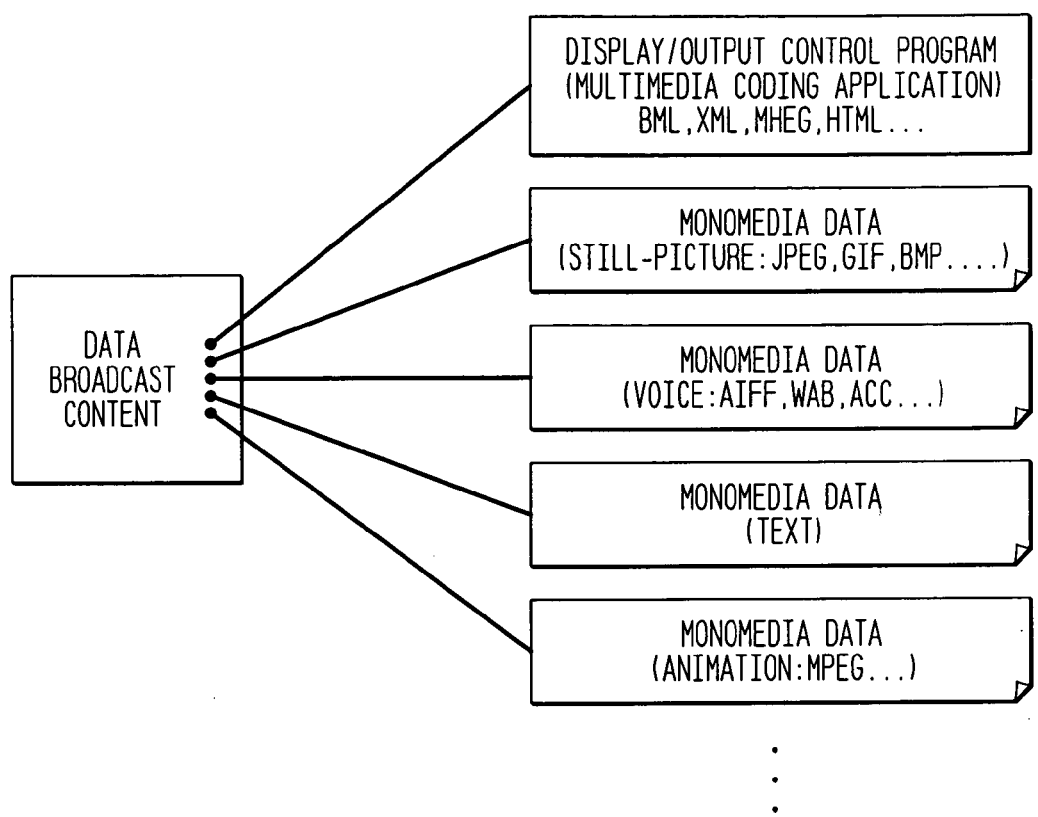
FIG. 1 is a schematic diagram showing the structure of the data broadcast content.
Figure 2:
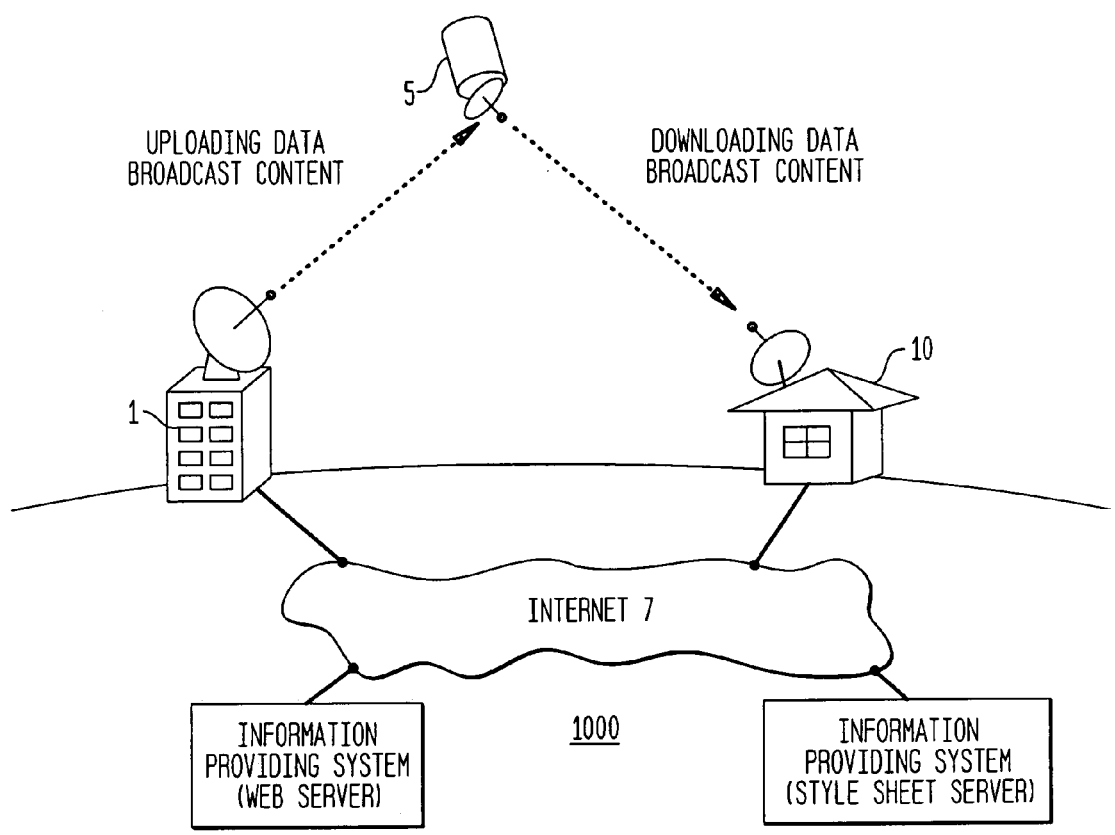
FIG. 2 is a diagram showing a configuration of a digital satellite data broadcast system for carrying out the present invention.

FIG. 2 shows a configuration of a satellite digital broadcast system 1000 for carrying out the present invention. The satellite digital broadcast system 1000 comprises a Broadcast Server 1 for providing broadcast services, a Broadcast Satellite 5 for relaying broadcast data, and a Receiver/Decoder 10 for receiving the broadcast data from the Broadcast Satellite 5.

One or more Broadcast Servers 1 are located on the ground, and the Broadcast Satellites 5 are dispersed above the earth. The Receiver/Decoder 10 corresponds to a household and may be present in an unlimited number. Data is delivered through the Broadcast Server 1 and the Broadcast Satellites 5 as a one-way communication.

For a digital data broadcast, data is transferred at a rate of 10 to 50 Mbps. The Broadcast Server 1 multiplexes AV (audio and visual) data constituting the main body of broadcast programs together with data broadcast content that includes program information supplementary to the broadcast programs and distributes the same. The AV data is normally compressed according to the MPEG (Motion Picture Experts Group) 2 format.

Data broadcast content storage modules comprised of various monomedia data, including text data, still picture data, animation data and voice data, as well as a program for controlling the display and output of the monomedia data or of the "multimedia coding application" are delivered in a form of a data carousel.

The multimedia coding application is described in the XML (eXtensible Markup Language) language format and includes a DTD document defining the document format. The DTD documents and/or style sheets, however, are not always included in the content for distribution. Each module includes a script defining the voices, still pictures and movements used in animations.

Each Receiver/Decoder 10 and Broadcast Server 1 may be linked bidirectionally by a wide area network 7, such as the Internet, or by a leased line (not shown). In this case, the Internet 7 may serve as the upstream line from the Receivers/Decoders 10 to the Broadcast Server 1. For example, it is possible to provide partially on-demand broadcast services using the Internet 7. In this case, however, it is preferable that a high-speed analog telephone link of 56 Kbps or more, a high-speed wireless communication link of about 10 to 64 Kbps, a 128 Kbps ISDN (Integrated Services Digital Network) link or a 5 to 30 Mbps class cable link be used.

Innumerable hosts, i.e., computer systems, are scattered on the Internet 7 and are connected using, for example, TCP/IP (Transmission Control Protocol/Internet Protocol). Some of the hosts are servers that provide information to other servers for a fee or free of charge.

Typical examples of servers on the Internet 7 are Web servers, known as WWW (World Wide Web) servers, that provide HTTP (Hyper Text Transfer Protocol) objects described in HTML (Hyper Text Markup Language). A Style Sheet Server distributes style sheets for a fee or for free of charge via the Internet 7.

In Japan, the ARIB (Association of Radio Industries and Businesses) has pursued standardization of the digital satellite data broadcast. According to this standard, real-time AV data constituting the main body of the digital satellite broadcast programs as well as the data broadcast content which is supplementary to the broadcast programs are distributed in parallel.

The structure of the content distributed by the digital satellite data broadcast is now explained with reference to FIGS. 3 and 4.

Figure 3:
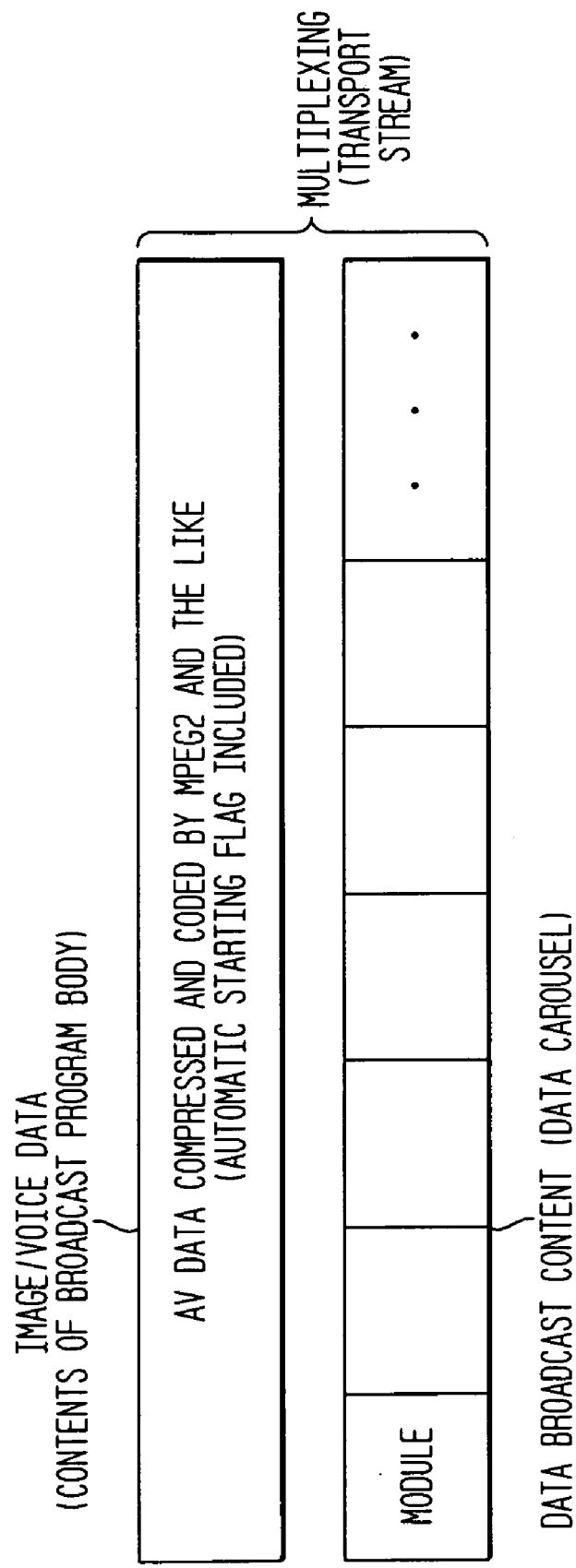
FIG. 3 is a schematic diagram showing the structure of data broadcast content in a digital satellite data broadcast.

FIG. 3 shows schematically the structure of broadcast content delivered as part of the digital satellite data broadcast. Broadcast content is constituted in the form of a transport stream obtained by multiplexing real-time AV data which is compressed according to a specified compression standard, such as MPEG (Motion Picture Experts Group) 2, and then broken down into the transport layers of the OSI (Open Systems Interconnection) reference model. The real-time AV data constitutes the main body of satellite broadcast programs, and the broadcast content constitutes broadcast program information supplementary to the main body of broadcast programs and other data broadcast services.

The data broadcast content consists of a plurality of data modules. Each data module includes various types of information supplementary to the main body of broadcast programs. An example of broadcast program information is the EPG (Electric Program Guide) which includes the functions of reserving VTR recording as well as the display of a broadcast schedule and names of broadcast programs. Broadcast program information may include information relating to the main body of a broadcast program, such as the title and date of the broadcast program and the cast of the program.

As shown in FIG. 3, portions of the data broadcast content are transformed into a data carousel so that each data module appears repeatedly during the broadcast of the main body of the program. As a result, the receiving system 10 can obtain a desired data module at an arbitrary time during the broadcast of the program, and a cache memory can be omitted. Also, automatic starting flags for synchronization with the display output time of modules in the MPEG-2 compressed real-time AV data may also be stored therein.

FIG. 4 shows the structure of a data module. The data module consists of a plurality of resource elements including a control program which determines how the data broadcast should be displayed or outputted, hereinafter referred to as a multimedia coding application, scripts stipulating movements, voice data, text data, still pictures, animation data and other monomedia data. Each monomedia data object constituting part of the data broadcast is handled by multimedia coding applications.

Each resource element of a data module is an independent file having a specified format. Voice data is written using file formats exclusively made for voice, such as AIFF, WAV, and AAC. Still picture data is written using file formats exclusively made for images, such as JPEG, PNG, and GIF. The resource location information describes the position of each resource element in the data module.

A multimedia coding application is a program for controlling how the EPG, advertisement information and other various data supplementary to the main body of broadcast programs is to be displayed and outputted. XML (eXtensible Markup Language) may be used as a format for describing multimedia coding applications.

XML is a descriptive language wherein tags are freely defined, namely, attributes can be described without restrictions. XML allows for a high degree of freedom and is highly compatible with general-purpose computers and with the Internet. The optional definition of tags allows for the handling of a string of characters written in a document as data to which meanings are assigned. In other words, the definition of the tags enables the expression of each tag data as data having a meaning which is other than a simple purpose of displaying. In addition, the definitions of the tags enable the structuring and describing of the XML instances and the data of such instances.

Distribution content described in the XML language format is given meaning according to the tag definition. As a result, data intended originally for a digital broadcast can be exchanged among a variety of information devices, such as computers, TVs, telephones, etc.

The definitions of the tags, or the definitions of document formats as XML instances, are set out in DTD (Document Type Definition) documents. In addition, because XML instances themselves do not contain style information specifying an actual format of an expression, style sheets may be attached thereto. The style sheets may be written in XSL (eXtensible Style Sheet Language), CSS (Cascade Style Sheet) language, or XSLT (XSL Transformation), which is a standard derived from the XSL.

Apart from the style sheets, scripts stipulating the movement of multimedia content consisting of various monomedia data, including voice, text, still pictures, animation, etc., can be used.

Figure 5:
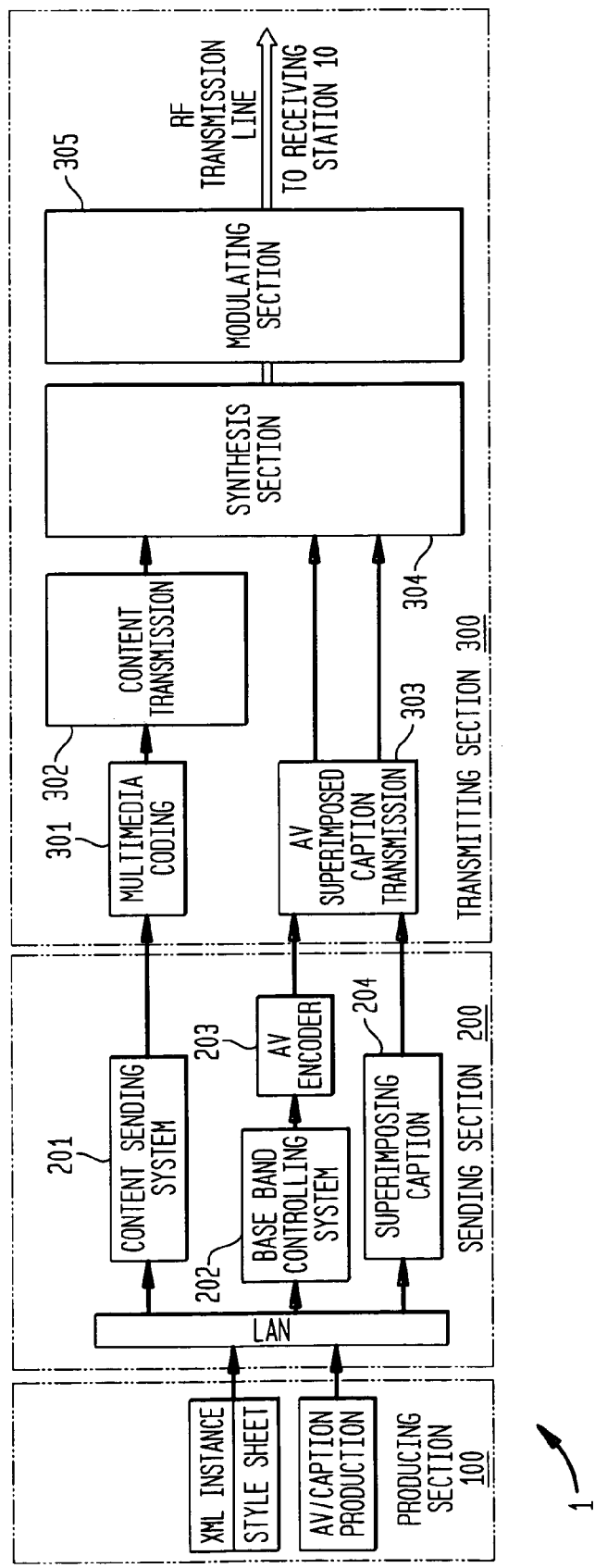
FIG. 5 is a schematic diagram showing a configuration for transmitting digital transfer data within a transmitting system.

FIG. 5 shows a configuration for transmitting data broadcast content using the Broadcast Server 1 or using another transmitting system. The broadcast system 1 is comprised of a Producing Section 100, a Searching Section 200 and a Transmitting Section 300.

The Producing Section 100 produces the content of the broadcast program information that is to be sent out as a data broadcast content. In other words, the Producing Section 100 produces various resource elements constituting a data module, such as XML (eXtensible Markup Language) instances, style sheets prescribing the expression format of the XML instances, still pictures, animation data, voice data, subtitles text, and other monomedia data, hereinafter referred to as AV subtitles, as objects contained in broadcast program information.

The broadcast content is transferred to the Sending Section 200 through, for example, a LAN (Local Area Network) of the Broadcast Server 1.

The Sending Section 200 packets the output data using a Content Sending Transfer System 201, a Base Band Controlling System 202, an AV Encoder 203, and a Superimposing caption or Subtitle Insertion System 204, and transfers the packeted data to the Transmission Section 300.

In the Transmitting Section 300, XML instances are codified at a Multimedia Coding Section 301 and transferred to a Content Transmission System 302. A Synthesis Section 304 synthesizes the output data from the Content Transmission System 302 and the AV Subtitles Transmission System 303. A Modulation Section 305 modulates the synthesized signals into RF signals, and transmits the same to Receivers/Decoders 10 through a RF transmission line.

On the RF transmission line, the RF signals are first transmitted from the transmission antenna of the Broadcast Server 1 to the Broadcast Satellite 5 and then, after passing through the Broadcast Satellite 5, are received by the receiving antenna of the Receiver/Decoder 10.

Figure 6:
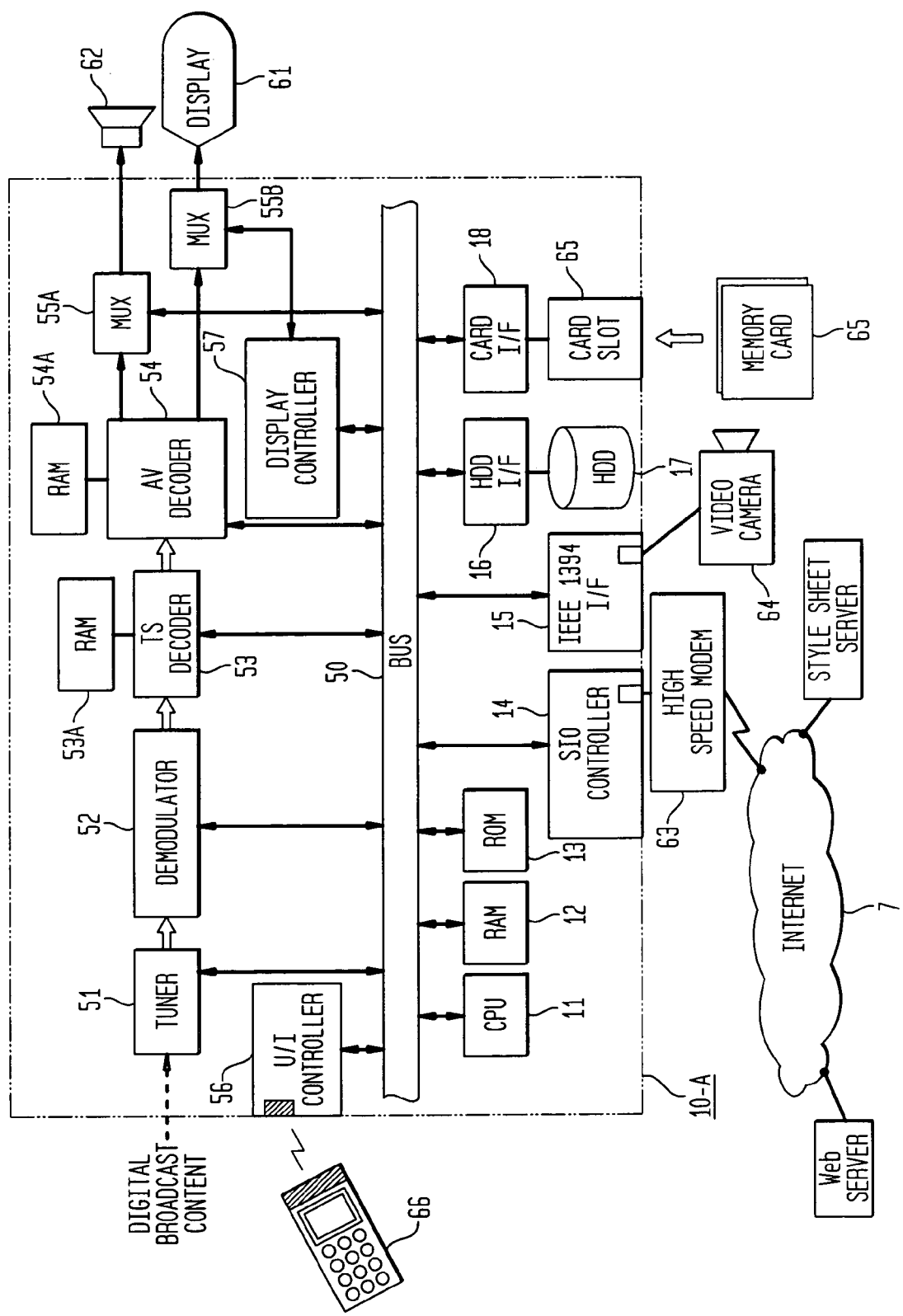
FIG. 6 is a schematic diagram showing a hardware configuration of an example of a receiving system of a receiver/decoder of the invention and, more specifically, showing a configuration of a receiving system in the form of an STB (Set Top Box).

FIG. 6 shows a configuration of an example of a digital satellite data broadcast receiving system 10-A of a receiver/decoder 10. The receiving system 10-A is widely used among households, for example, in the form of a STB (Set Top Box).

In the receiving system 10-A, a CPU 11 serves as the main controller and is interconnected with various hardware components through a bus 50 to exercise control over each of the components.

Broadcast waves are received by an antenna (not shown) and supplied to a tuner 51. The broadcast waves are arranged in a specified format and may comprise cable broadcast waves, ground waves, satellite broadcast waves or other transmitted waves.

The tuner 51, while under instructions from the CPU 11, tunes to one or more specified channels and outputs the received data to a demodulator 52. The demodulator 52 decodes the received data into digital signals. The configuration of the tuner 51 depends on whether the broadcast waves are analog or digital signals.

The demodulated digital data is in the form of a transport stream formed of AV data, previously compressed using the MPEG 2 compression standard, and data broadcast content. The AV data contains visual and audio information that constitute the broadcast program body. The data broadcast content is data supplementary to this broadcast program body and includes, for example, an EPG (Electric Program Guide). It should be noted that the transport stream is one part of the transport layer described in the OSI (Open Systems Interconnection) reference model.

A transport stream (TS) decoder 53 interprets the transport stream, divides the transport stream into the AV data and the data broadcast content, transfers the AV data to an AV decoder 54 and the data broadcast content to the CPU 11 through the bus 50. The TS decoder 53 may be provided with a memory 53A for storing work data locally.

Upon receiving real-time AV data from the TS decoder 53, the AV decoder 54 divides the AV data into compressed picture data and into compressed voice data. The picture data is then de-compressed according to the MPEG2 standard to reproduce the original picture signals, and the voice data is decoded using PCM (Pulse Code Modulation) and synthesized with added sound to reproduce the voice signals. The AV decoder 54 may be provided with a memory 54A for storing work data locally. The reproduced picture signals are then displayed on a display 61 via a multiplexer 55B, and the reproduced voice signals are outputted by a speaker 62 via the multiplexer 55A.

A user interface (U/I) controller 56 processes the input provided by users and processes signals received from a remote control 66 by which operating buttons/switches (not shown) are used to send manual input from the users via infrared rays (IR). A display panel or a LED indicator (not shown) may be included to display the current settings.

One of the operating buttons of the user interface controller 56 or one of the operating buttons of the remote control 66 may be allocated to operating the validation/invalidation of the display output received from the display controller 57 to provide the display/output of program information based on the data broadcast content.

The CPU 11 controls the operation of the receiving system 10-A and processes the data broadcast content transferred through the bus 50. The data broadcast content includes instances described in the XML (eXtensible Markup Language) format. The CPU 11 can apply processing software, such as XML parsing and XSL processing software, on the XML instances and serves as an "XML engine" on a platform controlled by an operating system (OS).

A RAM (Random Access Memory) 12 loads the execution program code or writes work data for the execution program of the CPU 11. A ROM (Read Only Memory) 13 permanently stores a self-diagnostic and/or an initialization program to be executed when the receiving system 10 is switched on. The ROM may also store microcode for operating the hardware.

A serial input/output (SIO) controller 14 is a peripheral device for exchanging serial data with external devices of the receiving system 10-A. A serial port provided on the SIO controller 14 provides an external connection to a high-speed modem 63 with a transfer rate of, for example, 56 Kbps for modulating/demodulating transfer data on the analog telephone line. A PPP (Point-to-Point Protocol) connection may be provided to a specified access point (not shown) by the high-speed modem 63 and connects the receiving system 10-A to the Internet 7 or other wide area network.

An IEEE (Institute of Electrical and Electronics Engineers) 1394 interface 15 provides a high-speed, serial interface that transmits and receives data at a rate of about several hundred Mbps. The IEEE 1394 port can accept daisy chain connections or tree connections to external apparatus according to the IEEE 1394 standard, such as a video camera 64 or scanner (not shown).

A hard disc drive (HDD) 17 provides external storage for programs and data arranged in a prescribed file format and typically has a relatively large capacity of several GB. The HDD 17 is connected to the bus 50 through a hard disc card interface (I/F) 18.

The hard disc card interface 18 executes the bus protocol between a card-type device 65, loaded in a card slot 19, and the bus 50. Such a card-type device 65 includes a PC card that is the size of a credit card and constructed as a cartridge. The PC card operates using the PC Card Standard jointly formulated by the PCMCIA (Personal Computer Memory Card Interface Association) and the JEIDA (Japan Electronic Industry Development Association).

An example of the PC card is a memory card consisting of nonvolatile memory chips as well as erasable/rewritable memory chips, such as an EEPROM (Electrically Erasable and Programmable ROM). When the receiving system 10-A is of relatively small size and low price, it is sometimes difficult to integrate a large capacity and large volume HDD 17. In such a case, it is preferable to use a detachable and portable memory card. Such detachable memory cards 65, however, need not to be limited to a PC card but may instead be so-called "memory sticks."

The display controller 57 controls the display output of broadcast program information based on the data broadcast content.

Thus, the CPU 11 controls the tuning operation of the tuner 51 according to user input commands received through the user interface controller 56 and controls the display of program information. In other words, the CPU 11 processes the digital broadcast data transferred from the TS decoder 53, converts the data into display data, and supplies the display data to the display controller 57. The display controller 57 generates picture signals comprised of program information based on the display data and supplies the picture signals to the multiplexer 55B. The CPU 11 also processes voice data contained in the digital broadcast data and supplies the same to the multiplexer 55A through the bus 50. The multiplexers 55A and 55B respectively multiplex the display data and voice data supplied from the CPU 11 using the picture data and voice data outputted from the AV decoder 54 as the main body of broadcast program for external output to the display 61 and the speaker 62.

Figure 7:
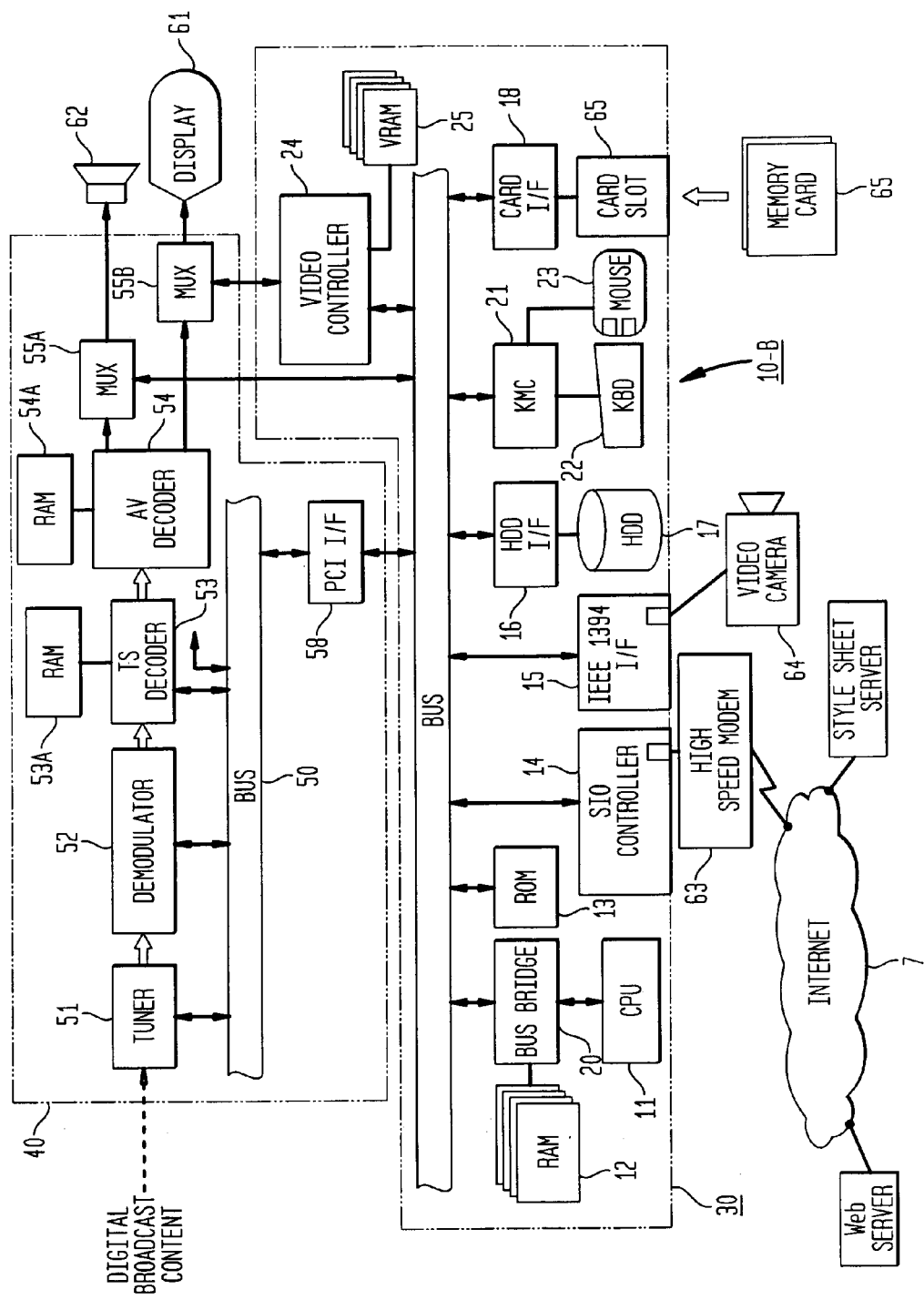
FIG. 7 is a schematic diagram showing another hardware configuration of a receiving system of the invention and, more specifically, showing a hardware configuration of a receiving system in the form of a general-purpose computer having a tuner card used for satellite digital broadcast.

FIG. 7 shows the configuration of a digital broadcast data receiving system 10-B according to another embodiment of the invention. The receiving system 10-B is controlled by a general-purpose computer 30 having a digital tuner card 40 for receiving satellite digital broadcasts.

The digital tuner card 40 consists of a tuner 51, a demodulator 52, a TS decoder 53, an AV decoder 54, RAMs 53A and 54A, and multiplexers 55A and 55B. The configuration and function of these elements shown is substantially identical with the elements shown in FIG. 6 having the same reference numbers. The digital satellite broadcast tuner card 40 is connected to a system bus (such as a PCI bus) 31 in the computer system 30 via a bus interface (such as a PCI interface) 58.

The broadcast wave received by an antenna (not shown) is selected by the tuner 51 and demodulated by the demodulator 52. The TS decoder 53 interprets the demodulated transport stream and divides the transport stream into AV data, compressed according to the MPEG 2 format, and into data broadcast content. The AV data is supplied to the AV decoder 54, processed in the manner described above, and outputted to the external display 61 and to the speaker 62. The data broadcast content, on the other hand, is transferred to the computer system 30 through the PCI interface 58 to be processed by the CPU 11 of the system.

The general-purpose computer system 30 includes a printed circuit board (not shown) having a CPU 11 and other main circuit components and is called a motherboard. The tuner card 40 is provided, for example, in the form of an adaptor card and inserted into a bus slot (not shown) located on the motherboard.

Alternatively, the tuner card 40 is supplied in the form of a PC card in accordance with the standards established by the PCMCIA/JEIDA and is incorporated into the computer system 30 by insertion into a PC card slot 19.

The CPU 11 serves as a main controller and controls the operation of the computer system 30. The CPU 11 can execute various software programs for processing XML content, such as XML parsing or XSL processing, on an operating system (OS) platform.

The processor bus is directly connected with the external pins of the CPU 11 and is interconnected with the system bus 31 through a bus bridge 20.

The bus bridge 20 includes a data buffer for absorbing the differences in data speeds between the processor bus and the system bus 31 and includes a memory controller for controlling access to the RAM 12.

The RAM (Random Access Memory) 12 is a writable volatile memory for loading the executable program code of the CPU 11 and for writing work data for the programs. The RAM is normally constituted of a plurality of DRAM (Dynamic RAM) chips.

The system bus 31 is a common signal transmission line that includes an address bus, a data bus, a control bus, etc., which, for example, may be a PCI (Peripheral Component Interconnect) bus. Various peripheral devices meeting the PCI interface standard are interconnected. An example of such a peripheral device is the digital satellite broadcast tuner card 40. The peripheral devices on the bus 31 are allocated particular I/O addresses or memory addresses, and a program executed by the CPU 11 controls the transfer of data and commands to the peripheral devices using the I/O addresses or memory addresses of the peripheral devices.

The ROM (Read Only Memory) 13 permanently stores a self-diagnostic program, such as a Power On Self Test, that is executed upon switching on the power for the computer system 30 and stores the basic input/output system (BIOS)

for operating hardware. The ROM 13 may include, for example, an electrically erasable and programmable ROM (EEPROM).

The Serial I/O (SIO) controller 14 is a peripheral controller for exchanging serial data with external apparatus of the computer system 30. A serial port provided on the SIO controller 14 receives an external connection with a high-speed modem 63 at a transfer rate of, for example, 56 Kbps for modulating/demodulating transfer data over an analog telephone line. A PPP (Point-to-Point Protocol) connection to a specified access point (not shown) using a high-speed modem 63 connects the computer system 30 or the receiving system 10-B to the Internet 7.

An IEEE 1394 interface 15 provides a high-speed serial interface for transmitting and receiving data at a speed of several hundred Mbps. The IEEE 1394 port can accept daisy chain connections or tree connections with external devices that conform to the IEEE 1394 standard. Such apparatus include, for example, a video camera 64 or a scanner (not illustrated).

The hard disc drive (HDD) 17 provides external storage for programs or data written in a specified file format and has normally a capacity of about several GB. The HDD 17 is connected with the system bus 33 through the hard disc interface 16. The interface standards according to which the hard disc drive is connected with the computer system 30 are, for example, an IDE (Integrated Drive Electronics) standard, a SCSI (Small Computer System Interface) standard, etc.

The keyboard/mouse controller (KMC) 21 processes user inputs received from the keyboard 22 or from the mouse 23. The KMC 21 detects scan codes inputted from the keyboard 22 or a coordinate designation inputted from the mouse 23, and issues an interrupt request to the CPU 11. Ordinary command inputs to the computer system 30 and other input operations to the receiving system 10-B, including channel selection, can be performed through the keyboard 22 and the mouse 23.

One of the function keys of the keyboard 22 or one of the menu buttons disposed on the display 61 is allocated to the validation or invalidation of display outputs received from the video controller 24 or from the display outputs of program information based on the digital transfer data.

The card interface 18 executes the bus protocol between the bus 50 and a card-type device 65 inserted into the card slot 19, such as a PC card having a credit card size and a cartridge shape. The operation of the PC card is governed by the PC Card Standard jointly formulated by the PCMCIA and the JEIDA.

The PC card may be a memory card comprised of nonvolatile and erasable/rewritable memory chips, such as an EEPROM. When the digital broadcast receiving system 10-B is designed to be of relatively small size and low price, integration of large capacity and a large volume HDD 17 is difficult. In such a case, a detachable and portable memory card is preferred. The detachable memory cards 65, however, need not to be limited to a PC card but may be a "memory stick."

The video controller 24 controls the screen display based on plotting instructions given by the CPU 11 and is provided with a frame memory (VRAM) 25 for temporarily storing the plotting information. Preferably, the video controller 24 has a plotting capacity for at least VGA (Video Graphics Array) or, more preferably, for example, SVGA (Super Video Graphics Array) or XGA (extended Graphics Array).

The CPU 11 controls the tuning of the tuner 51 and controls the display of program information in response to commands inputted by the user through the keyboard 22 or the mouse 23. In other words, the CPU 11 processes the digital broadcast data supplied from the TS decoder 53, converts the processed data into display data and supplies the displayed data to the video controller 24. The video controller 24 generates image signals for program information based on the display data, and supplies the image signals to the multiplexer 55B. The CPU 11 also processes the voice data contained in the digital broadcast data and supplies the voice data to the multiplexer 55A through the bus 50. The multiplexers 55A and 55B each multiplex display data and voice data supplied from the CPU 11 with the image data and voice data outputted from the AV decoder 54 and then output the result to the display 61 and the speaker 62, respectively.

The satellite digital data receiving system 10 requires many of the same circuits shown in FIGS. 6 and 7. These circuits are, however, known to those skilled in the art and are therefore omitted in the present specification. To avoid needless complication of the drawings, the connections among various hardware blocks are illustrated only partially.

For example, though not illustrated in FIGS. 6 and 7, the receiving system 10 may be provided with a FDD (Floppy Disc Drive), a CD-ROM drive, a MO (Magneto-Optical) disc drive and/or other external storage devices into which a FD (Floppy Disc), a CD-ROM, an MO and/or other portable recording media which may be loaded and then accessed for writing data and retrieving data.

Figure 8:
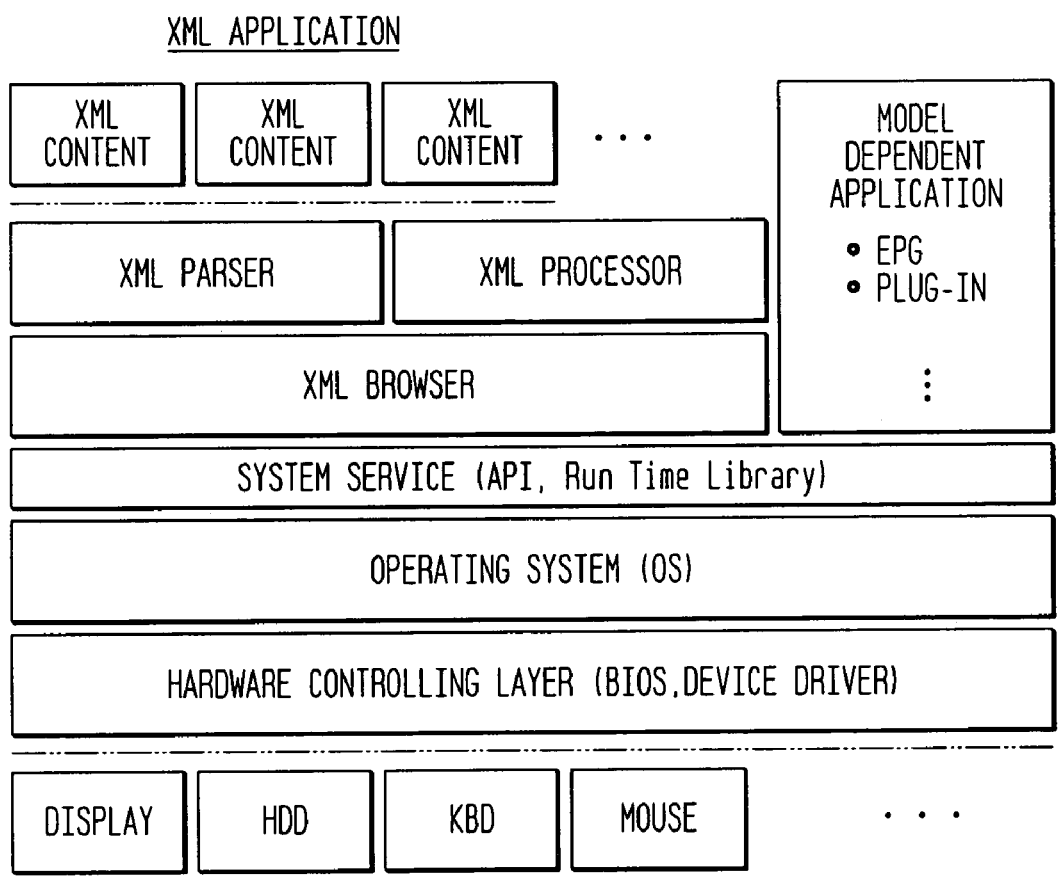
FIG. 8 is a schematic diagram showing a hierarchical configuration of various software programs executed in the digital broadcast data receiving systems shown in FIGS. 6-7.

FIG. 8 shows the hierarchical structure of various software programs executed by the digital broadcast data receiving system 10. The functions of each layer of software are as follows:

The hardware control layer, shown as the bottom layer, absorbs differences between the hardware vis-à-vis the top software, such as the operating system (OS), and executes processing in response to direct input/output operations that are generated by the hardware in the form of hardware interrupts.

The hardware control layer is provided to the receiving system 10 in the form of a BIOS (Basic Input/Output System) stored permanently, for example, in the ROM 13 or in the form of device drivers installed in the HDD 17.

The operating system (OS) is the basic software for managing the hardware and software in the receiving system 10. The OS includes various subsystems such as the file manager for managing the file records on the HDD 17, the memory manager for managing memory space, the resource manager for managing the allocation of system resources, the scheduler for managing the execution of tasks, the window system for controlling the window displays on the display, etc.

The system service is a collection of functions that applications and other higher layer programs may use to call various functions of the OS and includes an API (Application Programming Interface) and a run-time library. The system service eliminates the need for applications to directly operate various hardware devices and ensures the consistency of the hardware operation.

The XML applications control the way broadcast data is displayed and outputted and are comprised of XML instances that are written in XML using language arbitrarily definable tags. Each XML instance may be accompanied by a DTD document for defining the document format, a XSL document serving as a style sheet for prescribing the display format, a CSS or XSLT, a standard derived from XSL or other style sheets.

The XML parser is a program for parsing DTD documents and XML documents and for delivering document objects or other results of the parsing operation to the XSL processor. The document object is a structured document having a tree structure in accordance with the tags of the original XML document.

The XSL processor converts document objects into an expression that is formatted according to the description of the XSL document. More specifically, document objects are retrieved from a tree data source, and various elements of the tree are converted into execution objects. For example, the objects are converted into API (Application Programming Interface) against the XML browser. Alternatively, if the element is written in a JAVA script, objects that can be delivered to a Java VM engine are generated.

The method of receiving XML instances and other data broadcast content in the digital satellite data broadcast receiving system 10 is now explained.

Figure 9:
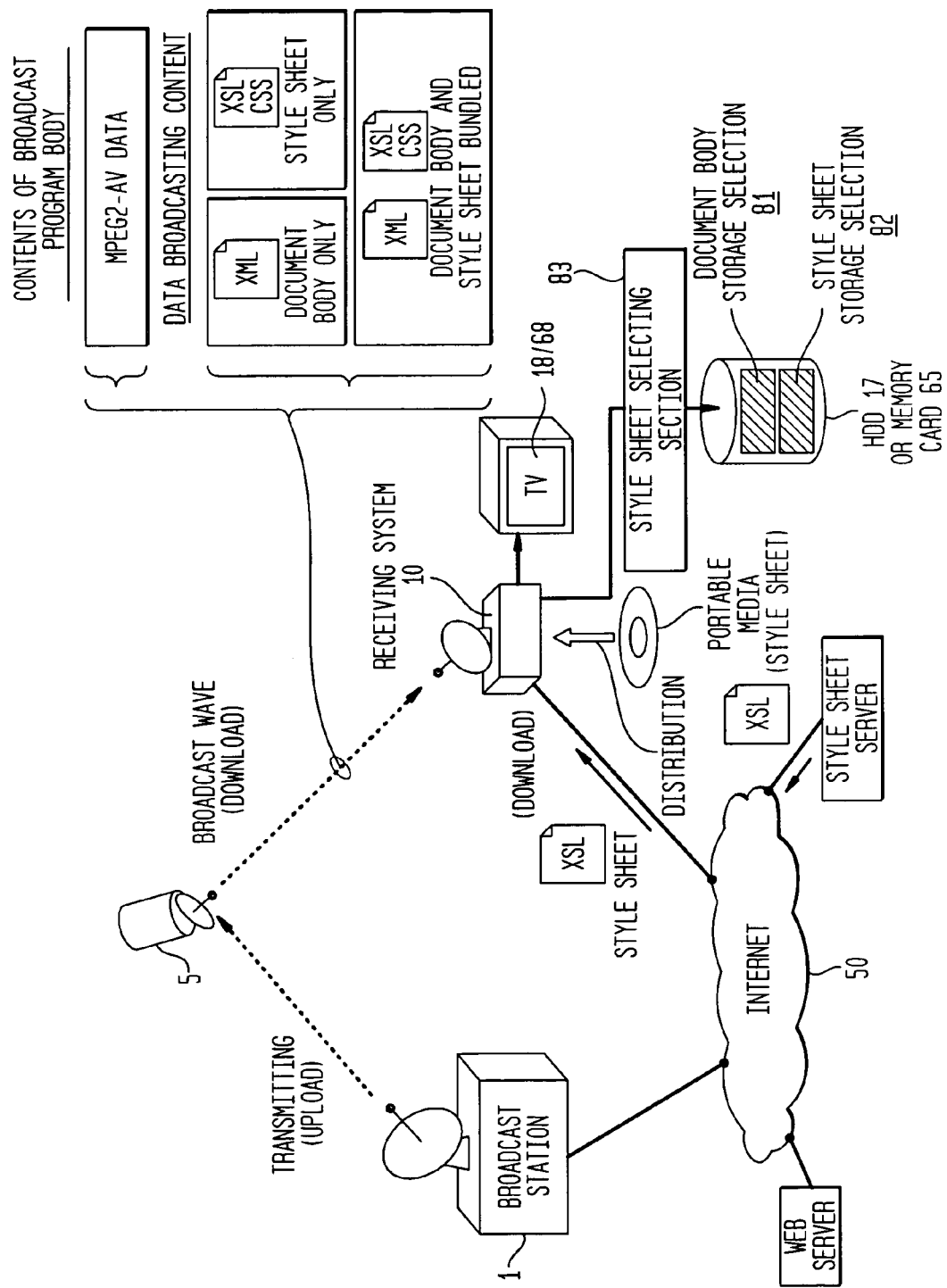
FIG. 9 is a diagram showing the manner in which data broadcast content is transferred to a receiver/decoder from a broadcast server via a broadcast satellite.

In the digital satellite broadcast system, as shown in FIG. 9, broadcast waves are first uploaded from the broadcast server 1 to the broadcast satellite 5 and then downloaded from the satellite 5 to the receiver/decoder 10.

As explained above with reference to FIG. 3, broadcast content is constituted as a transport stream formed by multiplexing AV data, which is first compressed according to prescribed compression standard, such as MPEG (Motion Picture Experts Group) 2, and data broadcast content. The transport stream is also broken down into transport layers in accordance with the OSI (Open Systems Interconnection) reference model.

As explained above with reference to FIGS. 6 and 7, the TS decoder 53 interprets the transport stream and divides it into an AV data portion and a broadcast content portion. The AV data portion is processed by the AV decoder 54, and the data broadcast content portion is processed by the CPU 11.

The data broadcast portion is comprised of a plurality of modules. Each module contains an EPG, advertisement information and other information supplementary to the main body of broadcast programs. The data broadcast content portion is transformed into a data carousel format wherein each data module appears repeatedly during the broadcast of the broadcast body. As a result, the receiving system 10 may obtain any desired data modules at an optimal timing during the broadcast period of the program and can omit providing cache memories.

On the receiving system side 10, the necessary ones of the received data broadcast content are stored temporarily in a local storage device of the receiving system 10, such as an HDD 17 or a memory card 65.

In a one-way transmission environment, such as a satellite broadcast, content written in the standard XML language are transmitted in a format in which XML instances and style sheets are packed together except where the style sheet use is limited.

In the present embodiment, the data broadcast content portion of the broadcast signals assumes that only XML instances and only style sheets are transmitted in addition to the joint packing of a multimedia coding application formed of XML instances and style sheets prescribing the expression format of the XML or XSL document, etc. The style sheet may be downloaded as a file supplied through the Internet, via other networks, or may be supplied by a portable recording medium such as an FD, a CD-ROM or an MO.

The receiving system 10 is stored separately from the XML instances and style sheets supplied. In other words, an external storage apparatus 17/65 for storing these document files consists of a document body storage section 81 for storing and managing XML instances (which may include a DTD document), and a style sheet storage section 82 for storing and managing only XSL documents as style sheets. As style sheets have become more sophisticated in their functions and added value, the style sheets or XSL documents have become valuable written works in the same way as documents proper. Therefore, to eliminate the unauthorized use or illicit use of style sheets, it is preferable that the style sheets storage section 82 be a secure storage area.

The receiving system 10 is designed such that style sheets supplied from outside are at first selected in the style sheet selecting section 83, and then the selected style sheets are stored in the style sheet storage section 82. The style sheet selection section 83 selects style sheets based on mainly the output attributes of the display apparatus 18/68 as well as based on the content attributes of the data broadcast content received as XML instances.

Figure 10:
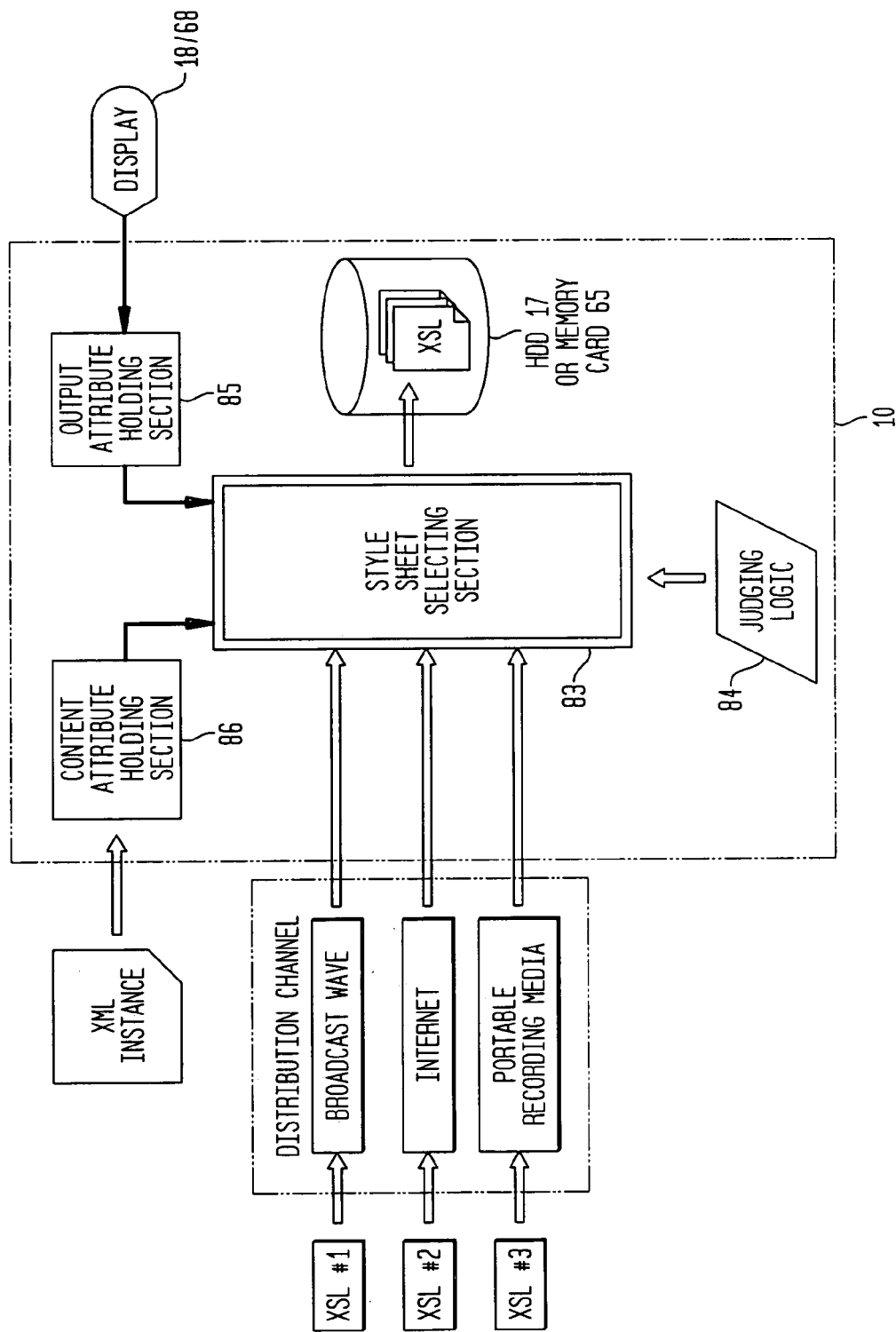
FIG. 10 is an illustration of a method of selecting style sheets in the receiving system.

A description of the method of selectively storing style sheets supplied in the receiving system 10 is now provided by referring to FIG. 10.

As shown in FIG. 10, a number of distribution routes is available for supplying style sheets to the receiving system 10. For example, part of the data broadcast signal in the form of data carousel, shown in FIG. 3, is used to transmit style sheets from the broadcast server 1 to an antenna and the tuner 51.

The style sheets may also be supplied by one of the information distribution services operated on the Internet. In other words, a style sheets server, see FIG. 2, supplies style sheets via the Internet 7, and the receiving system 10 obtains the style sheets by a file transfer, such as using FTP (File Transfer Protocol). The style sheet server may be operated by the same broadcast server 1 that transmits the main body of the data broadcast content or by a style sheet distributor that specializes in the manufacture and distribution of style sheets. The style sheets may be distributed by style sheet servers for consideration or free of charge.

Also, style sheets may be stored in portable recording media, such as a CD-ROM, an MO, a DVD, memory sticks, etc., and may be carried or transported between computer systems. For example, CD-ROMs containing style sheets may be marketed, rented or distributed to general users as a supplement to a magazine.

The style sheets selection section 83 selects only the style sheets necessary for the current application from the receiving system 10 from among one or more style sheets that are supplied in the manner described above. The selection section then stores the selected style sheets in a local external storage device, such as an HDD 17 or a memory card 65. Specifically, output attributes that are stored in the output attribute storage section 85 or content attributes that are stored in the content attributes storage section 86 are inputted into the determination logic 84 so that only the style sheets that meet the requirements set by the determination logic are extracted and stored.

The output attributes refer to the resolution attributes and other display characteristics of the display 18, 68 or other display apparatus that output data broadcast content formed of the XML instances as well as refer to the name of manufacturer and model name of the display apparatus. The manner in which the output attributes are obtained by the output attributes storage section 85 is not particularly pertinent. For example, the output attributes may be obtained automatically from the display 18/68 that is connected by cable to the receiving system 10 in accordance with a prescribed communication procedure at the time of system start up. Alternatively, users may manually input the attributes using the user interface of the receiving system 10.

The selection of the style sheets as a function of the output attributes depends on the difference between the optimum format of a display and the capacity of the display. For example, the optimum display format for a high-resolution, high-definition HDTV is not always adequate for a small-screen, low-resolution PDA.

The term "content attribute" refers to the content and characteristics of the XML instances. The content attributes can be identified, for example, by parsing tags in the XML instances, as Table 1 shows. Instead of parsing the content attributes on the receiving system 10 side, however, the data broadcast content may be distributed by including content identifiers corresponding to predetermined parsing results.

TABLE 1

| <POSITION> | <NUMBER> | <MPEG4> |
|---|---|---|
| <COLOR> | <PATTERN> | <VIDEO> |
| <SIZE> | <BOX> | <AUDIO> |
| <FONT> | <POINT> | <AVI> |
| <TEXT> | <CIRCLE> | <CGI> |
| <GRAPH> | <TRIANGLE> | <MOVIE> |
| <PICTURE> | <ARC> | <VECTOR> |
| <PALLET> | <DOT> | <HEADER> |
| <MENU> | <DIGIT> | <CHARACTER> |
| <FIGURE> | <CODE> | <WORD> |
| <WINDOW> | <FILE> | <STRUCT> |
| <HELP> | <BITMAP> | <MEMO> |
| <CLIP ART> | <MPEG> | <EVENT> |
| <SLIDE> | <MPEG1> | <LOGO> |
| <MODE> | <MPEG2> | <TASK> |
| <COPY> | <WIPE> | <FAST> |
| <CONTROL> | <EXPAND> | <SLOW> |
| <STATUS> | <TASK> | <CAPTURE> |
| <COMMAND> | <JOB> | <PLAY> |
| <FUNCTION> | <SPIN> | <REC> |
| <DATA> | <ELEVATE> | <VIEW> |
| <TIME> | <COLLECT> | <LINK> |
| <DATE> | <EXECUTE> | <JUMP> |
| <OBJECT> | <HOLD> | <MARK> |
| <GUIDE> | <AUTO> | <ID> |
| <SPELL> | <SYNC> | <EJECT> |
| <LANGUAGE> | <ASYNC> | <STOP> |
| <CAPTION> | <START> | <SLEEP> |
| <FOCUS> | <FORWARD> | <CONTINUE> |
| <ZOOM> | <REVERSE> | <GO> |

Style sheets are selected as a function of the content attributes because the optimum format of a display often differs depending on the elements included in the content and the type of medium. For example, the optimum format of a display may differ depending on whether the type and size of fonts specified in the display text and whether the bitmaps or the drawings are included.

The determination logic 84 provides indices for selecting style sheets depending on the output attribute and/or content attribute described above. The determination logic 84 may be, for example, in the form of a lookup table or in the form of rules formed of logic statements.

Table 2 below shows examples of determination logic 84 related to the output attributes and is arranged in a lookup table form. The resolution can be indicated from the display type obtained from the output apparatus 18/68 or from the output attributes, and the optimum choice of style sheets can be selected on that basis.

TABLE 2

| <DISPLAY TYPE> | <X size> | <Y size> |
|---|---|---|
| <HDTV> | 1920 | 1080 |
| <SDTV> | 704 | 480 |
| <VIDEO-CD> | 352 | 240 |
| <SXGA> | 1280 | 1024 |
| <XGA> | 1024 | 768 |
| <SGA> | 800 | 600 |
| <VGA> | 640 | 480 |
| <CGA> | 160 | 120 |
| <JPEG> | 704 | 480 |

Table 3 below shows examples of determination logic 84 related to the content attributes and is arranged in a lookup table format. The optimum style sheet or the XSL document file name can be retrieved according to the content identifiers described in the data broadcast content.

TABLE 3

| Content-ID | XSL FILE |
|---|---|
| 0 | BS-type 1 |
| 1 | BS-type 1 |
| 2 | BS-type 1 |
| 3 | BS-type 2 |
| 4 | BS-type 2 |
| 5 | BS-type 3 |
| 6 | BS-type 4 |
| 7 | BS-type 5 |

FIG. 11 shows examples of the determination logic 84 for the content attributes as set out in a format consisting of "if" logic sentences. The optimum style sheet is determined by applying the content identifiers provisionally stored in the content attribute storage section 86 to the determination logic 84. Accordingly, the XSL file "BS-type 1.xsl" is selected for a data broadcast content having less than three content identifiers ("content_id"), "BS-type 2.xsl" is selected for data broadcast content having from three to less than five identifiers, "BS-type 3.xsl" is selected for data broadcast content having from five to less than six identifiers, "BS-type 4.xsl" is selected for data broadcast content that have from six to less than seven identifiers, and "BS-type 5.xsl" is selected for data broadcast content having seven or more identifiers.

When the style sheets, which are ordinarily selected based on the output attributes and/or the content attributes, are not found in the local receiving system 10, i.e., when they have not been stored in a data carousel or have not been stored in a portable recording medium, the receiving system 10 may retrieve the information via the Internet 7, such as using a Web Browser, so that files may be downloaded from the style sheet server.

The manner in which the style sheet server supplies style sheets to the receiving systems 10 is not limited to a particular method. For example, the receiving system 10 may specify the file name of style sheets and download files from the style sheet server using the known FTP (File Transfer Protocol).

Alternatively, the receiving system 10 may send a request to the style sheet server to supply style sheets together with output attributes and/or content attributes. The style sheet server then processes the request, retrieves style sheets from its own local disc or from a remote disc on the Internet 7, finds the style sheets matching the request, and returns the matching style sheets to the receiving system 10 that made the request. Ordinary Web servers, which do not retrieve from databases, may serve as style sheet servers by initiating an external program using a CGI (Common Gateway Interface) application.

Figure 12:
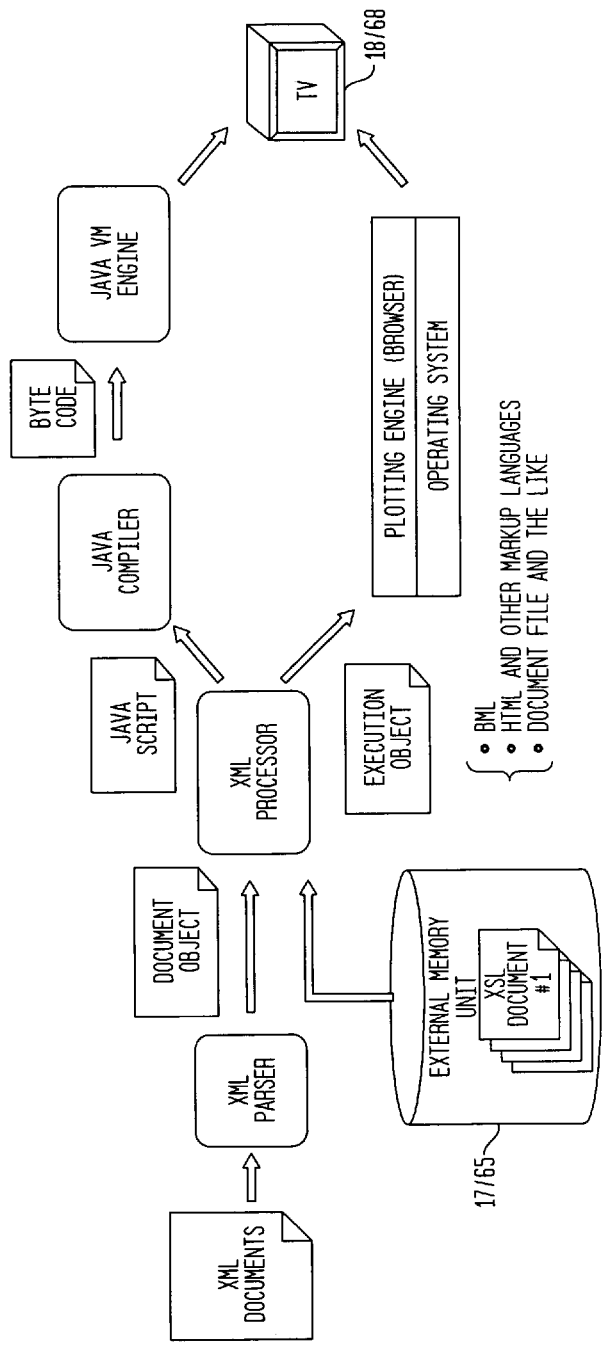
FIG. 12 is an illustration of the processing of received data broadcast content in the receiving system.

The method of processing the data broadcast content received in the receiving system 10 is now described with reference to FIG. 12. The matching of a style sheet with the output attributes of the output apparatus 18/68 and/or with the content attributes of the data broadcast content converts the XML documents into a desired executable format to obtain the optimum display format.

The receiving system 10 receives one or more style sheets as a part of the data broadcast content or via other distribution channels. The main body of data broadcast content is not necessarily limited to documents written in the XML language format or to the XML instances and may be, for example, written in SGML (Standard Generalized Markup Language), HTML (Hyper Text Markup Language), etc. The main body of data broadcast content may include XML instances and other DTD documents. A style sheet prescribing the expression format of the main body of an XML instance may be written, for example, in the XSL format.

FIG. 13 illustrates the document construction of a XML instance. A single XML instance is formed of a series of linked instances of identical service content that are each to be offered with different display types or with different output attributes. When the content is written in the XML language, the definition of the tags enables the connection of serially connected, but different, broadcast content by dividing the content by its tags. As a result, it is possible to distribute information for all possible output attributes using a single SML instance or a single data module and therefore efficiently use the transmission line band width.

When a single data broadcast content includes a plurality of XML instances, an appropriate XML instance is selected based on the output attributes held in the output attribute holding section 85. The XML instance is then inputted into a parsing program, known as a XML parser, which then outputs the processing result as a document object and delivers the object to the XSL processor module. The document object typically has a tree data structure that is defined according to the XML tags.

An XSL document is a style sheet, as mentioned earlier, for prescribing the expression format of XML instances, such as the display format that is sent to the output apparatus 18/68, and for prescribing the print format sent to the printer (not shown). An external storage apparatus 17/65 accumulates one or more XSL document file or files. The accumulated style sheets are selected at the style sheet selection section 83 described above.

The XSL processor copies XSL documents from the external storage apparatus 17/65, and converts the document objects into executable objects corresponding to a prescribed style in accordance with the description of the XSL documents. An executable object is, for example, an API (Application Programming Interface), a LIB or other command sent to the browser to make the main body of data broadcast content available for inspection.

If the original code is a Java script, it is delivered into the Java compiler (not shown) to be converted into an intermediate code called a byte code.

An executable document thus created is delivered into an execution engine, such as a browser used for plotting on the display 18 or 68. The browser may be an XML browser that processes only XML documents or may be a HTML browser that processes HTML documents. The browser and other execution engines generally operate on a platform provided by the operating system, such as by calling an API (Application Programming Interface) provided by the operating system.

An execution object, called a byte code, that is created by the Java compiler is then delivered on a Java VM (Virtual Machine) engine. The VM engine carries out, using an application or using an OS, a series of processing steps that combine operating procedures, such as specific keys and buttons, that end users can control.

As a variation of the present invention, only a single style sheet is issued to address a plurality of content attributes and output attributes instead of preparing a style sheet for each content attribute or output attribute. Such a system can be achieved by using, for example, Java script.

Though the style sheets stored in the receiving system 10 are designed for specific content attributes and/or specific output attributes, the processing required for applying the data broadcast content or the output apparatus to other attributes may be described in Java script.

FIG. 14 shows examples of a process of matching an output apparatus with output attributes and/or content attributes which is described in Java script. A XSL document file includes a Java script portion written in Java language as well as the code portion written in the XSL format.

The body of a style sheet, which is written in the XSL format, prescribes a display format for HDTV (High Definition TeleVision) as the display type. The Java script portion, on the other hand, describes processing for other display types, such as SDTV, SVGA, XGA, VGA, etc. according to the if-rule format. By using the if-rule sentences that are based on the output attributes stored in the output attributes storage section 85, the display output is matched with the output apparatus 18/68.

Formula (1) shows another example of the matching to the output attributes.

<SCRIPT LANGUAGE="JavaScrip"><*xsl*:comment><! [CDATA[var font_size;
font_size=documentElement.childNodes.item
(0); if(font_size=1) htmlString ="<*H1*><FONT
SIZE=8>"if(font_size=2) htmlString
="<H1><FONT SIZE=12>"if(font_size=3)
htmlString ="<H1><FONT SIZE=14>"]]</*xsl*:
comment></SCRIPT>  (1)

Among the scripts shown in the formula (1) above, the tag <SCRIPT LANGUAGE> shows the actual script portion. This script consists of a conditional sentence in an "if" format. More specifically, the display font size of data displayed in the tag <H1> is to be actively set by the receiving system 10, rather than the content distributing side or the broadcast server 1 side, according to the value substituted for a variable font_size.

Figure 15A:
FIGS. 15A, 15B and 15C are diagrams showing examples of various display formats related to the same information service that are switched according to a Java script.
Figure 15B:
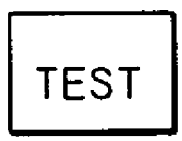
Figure 15C:

Thus, if font_size=1, the font size of data displayed will be 8 point (see FIG. 15A), if font_size=2, the font size of data displayed will be 12 point (see FIG. 15B), and if font_size=3, the font size of data displayed will be 14 point (see FIG. 15C).

Detailed information on the Java script can be found in various manuals, such as "Introduction to Java Script for Decorating Homepages", revised version, by Asao Nishikawa and Gijutsu Hyoron-sha.

The present invention has been explained with reference to specific embodiments. It is evident, however, that those skilled in the art may modify or substitute these embodiments to the extent that they do not deviate from the purpose of the present invention. In other words, the aspects of the present invention are disclosed only as examples and should not be interpreted so restrictively. The present invention is better defined by the "Claims".

INDUSTRIAL APPLICABILITY

As described in detail above, the present invention provides a data distribution technology that delivers documents in a language format in which arbitrarily definable tags are used, for example, XML (eXtensible Markup Language), in a format that is matched with the output attributes and/or the content attributes.

The present invention also provides data distribution technology for providing single content information in a format that can be used to match with output attributes and/or content attributes while distributing data using a broadcast or via a network.

When the present invention is applied to a satellite or ground wave broadcast business, it is possible to provide information matching with output attributes or content attributes based on a single content.

The invention claimed is:

1. A method of processing broadcast content, comprising:
storing output display attributes of a connected display device;
receiving digital broadcast signals;
decoding the received digital broadcast signals into AV data that includes visual and audio information and into supplementary data that includes content data written in a computer language format that includes extended markup language (XML) tags and having content attributes;
obtaining at least one style sheet written in the computer language format that includes the extended markup language (XML) tags and including format information used to set the display format of images to be displayed by a given display device;
selecting a particular style sheet from the at least one obtained style sheet based on the stored output display attributes and the decoded content attributes such that images that are displayed by the connected display device are of a particularly suitable format for the connected display device; and
processing the content data using the particular style sheet for display by the connected display device.

2. The method of claim 1, wherein the content data includes data selected from the group consisting of text data, still picture data, animation data, and voice data.

3. The method of claim 1, wherein the selected style sheet includes scripts that define the format information as a function of the stored display attributes.

4. The method of claim 1, wherein said step of obtaining at least one style sheet includes obtaining a plurality of style sheets, and said step of selecting a particular style sheet includes selecting at least one of the plurality of style sheets.

5. The method of claim 1, wherein said step of obtaining at least one style sheet includes obtaining the at least one style sheet from a remotely located server via a network.

6. The method of claim 1, said step of obtaining at least one style sheet includes obtaining the at least one style sheet from a portable recording medium.

7. The method of claim 1, further comprising:
combining the visual and audio information and the processed content data for output by the display device.

8. The method of claim 1, wherein the content data includes a data module that is periodically repeated in the content data.

9. A method of processing broadcast content, comprising:
storing output display attributes of a connected display device, the stored output display attributes including at least one output display attribute selected from the group consisting of a device manufacturer's name, and a device model name;
receiving digital broadcast signals;
decoding the received digital broadcast signals into AV data that includes visual and audio information and into supplementary data that includes content data written in a computer language format that includes extended markup language (XML) tags and having content attributes;
obtaining at least one style sheet written in the computer language format that includes the extended markup language (XML) tags and including format information used to set the display format of images to be displayed by a given display device;
selecting a particular style sheet from the at least one obtained style sheet based on the stored output display attributes and the decoded content attributes such that images that are displayed by the connected display device are of a particularly suitable format for the connected display device; and
processing the content data using the particular style sheet for display by the connected display device.

10. The method of claim 9, wherein the content data includes data selected from the group consisting of text data, still picture data, animation data, and voice data.

11. The method of claim 9, wherein the selected style sheet includes scripts that define the format information as a function of the stored display attributes.

12. The method of claim 9, wherein said step of obtaining at least one style sheet includes obtaining a plurality of style sheets, and said step of selecting a particular style sheet includes selecting at least one of the plurality of style sheets.

13. The method of claim 9, wherein said step of obtaining at least one style sheet includes obtaining the at least one style sheet from the digital broadcast signals.

14. The method of claim 9, wherein said step of obtaining at least one style sheet includes obtaining the at least one style sheet from a remotely located server via a network.

15. The method of claim 9, wherein said step of obtaining at least one style sheet includes obtaining the at least one style sheet from a portable recording medium.

16. The method of claim 9, further comprising:
combining the visual and audio information and the processed content data for output by the display device.

17. The method of claim 9, wherein the content data includes a data module that is periodically repeated in the content data.

18. An apparatus for processing broadcast content, comprising:
a holding section operable to store output display attributes of a display device connected to said apparatus;
a receiver operable to receive digital broadcast signals;
a decoder operable to input the digital broadcast signals supplied by said receiver and to decode the digital broadcast signals into AV data that includes visual and audio information and into supplementary data that includes content data written in a computer language format that includes extended markup language (XML) tags and having content attributes;
a selecting section operable to obtain at least one style sheet written in the computer language format that includes the extended markup language (XML) tags and including format information used to set the display format of images to be displayed by a given display device, and to select a particular style sheet from the at least one obtained style sheet based on the output display attributes supplied by said holding section and the content attributes supplied by said decoder such that images that are displayed by the connected display device are of a particularly suitable format for the connected display device; and a processor operable to process the content data using the particular style sheet selected by said selecting section for display by the connected display device.

19. The apparatus of claim 18, wherein the content data includes data selected from the group consisting of text data, still picture data, animation data, and voice data.

20. The apparatus of claim 18, wherein the selected style sheet includes scripts that define the format information as a function of the stored display attributes.

21. The apparatus of claim 18, wherein said selecting section is operable to obtain a plurality of style sheets, and to select at least one particular style sheet from the plurality of style sheets.

22. The apparatus of claim 18, wherein said selecting section is operable to obtain the at least one style sheet from a remotely located server via a network.

23. The apparatus of claim 18, wherein said selecting section is operable to obtain the at least one style sheet from a portable recording medium.

24. The apparatus of claim 18, further comprising:
a multiplexor operable to combine the visual and audio information and the processed content data for output by the display device.

25. The apparatus of claim 18, wherein the content data includes a data module that is periodically repeated in the content data.

26. An apparatus for processing broadcast content, comprising:
a holding section operable to store output display attributes of a display device connected to said apparatus, the stored output display attributes including at least one output display attribute selected from the group consisting of a device manufacturer's name, and a device model name;
a receiver operable to receive digital broadcast signals;
a decoder operable to input the digital broadcast signals supplied by said receiver and to decode the digital broadcast signals into AV data that includes visual and audio information and into supplementary data that includes content data written in a computer language format that includes extended markup language (XML) tags and having content attributes;
a selecting section operable to obtain at least one style sheet written in the computer language format that includes the extended markup language (XML) tags and including format information used to set the display format of images to be displayed by a given display device, and to select a particular style sheet from the at least one obtained style sheet based on the output display attributes supplied by said holding section and the content attributes supplied by said decoder such that images that are displayed by the connected display device are of a particularly suitable format for the connected display device; and
a processor operable to process the content data using the particular style sheet selected by said selecting section for display by the connected display device.

27. The apparatus of claim 26, wherein the content data includes data selected from the group consisting of text data, still picture data, animation data, and voice data.

28. The apparatus of claim 26, wherein the selected style sheet includes scripts that define the format information as a function of the stored display attributes.

29. The apparatus of claim 26, wherein said selecting section is operable to obtain a plurality of style sheets, and to select at least one particular style sheet from the plurality of style sheets.

30. The apparatus of claim 26, wherein said selecting section is operable to obtain the at least one style sheet from the digital broadcast signals.

31. The apparatus of claim 26, wherein said selecting section is operable to obtain the at least one style sheet from a remotely located server via a network.

32. The apparatus of claim 26, wherein said selecting section is operable to obtain the at least one style sheet from a portable recording medium.

33. The apparatus of claim 26, further comprising:
a multiplexor operable to combine the visual and audio information and the processed content data for output by the display device.

34. The apparatus of claim 26, wherein the content data includes a data module that is periodically repeated in the content data.

35. A computer-readable medium recorded with instructions for carrying out a method of processing broadcast content, said method comprising:
storing output display attributes of a connected display device;
receiving digital broadcast signals;
decoding the received digital broadcast signals into AV data that includes visual and audio information and into supplementary data that includes content data written in a computer language format that includes extended markup language (XML) tags and having content attributes;
obtaining at least one style sheet written in the computer language format that includes the extended markup language (XML) tags and including format information used to set the display format of images to be displayed by a given display device;
selecting a particular style sheet from the at least one obtained style sheet based on the stored output display attributes and the decoded content attributes such that images that are displayed by the connected display device are of a particularly suitable format for the connected display device; and
processing the content data using the particular style sheet for display by the connected display device.

36. The computer-readable medium of claim 35, wherein the content data includes data selected from the group consisting of text data, still picture data, animation data, and voice data.

37. The computer-readable medium of claim 35, wherein the selected style sheet includes scripts that define the format information as a function of the stored display attributes.

38. The computer-readable medium of claim 35, wherein said step of obtaining at least one style sheet includes obtaining a plurality of style sheets, and said step of selecting a particular style sheet includes selecting at least one of the plurality of style sheets.

39. The computer-readable medium of claim 35, wherein said step of obtaining at least one style sheet includes obtaining the at least one style sheet from a remotely located server via a network.

40. The computer-readable medium of claim 35, wherein said step of obtaining at least one style sheet includes obtaining the at least one style sheet from a portable recording medium.

41. The computer-readable medium of claim 35, wherein said method further comprises:
combining the visual and audio information and the processed content data for output by the display device.

42. The computer-readable medium of claim 35, wherein the content data includes a data module that is periodically repeated in the content data.

43. A computer-readable medium recorded with instructions for carrying out a method of processing broadcast content, said method comprising:
storing output display attributes of a connected display device, the stored output display attributes including at least one output display attribute selected from the group consisting of a device manufacturer's name, and a device model name;
receiving digital broadcast signals;
decoding the received digital broadcast signals into AV data that includes visual and audio information and into supplementary data that includes content data written in a computer language format that includes extended markup language (XML) tags and having content attributes;
obtaining at least one style sheet written in the computer language format that includes the extended markup language (XML) tags and including format information used to set the display format of images to be displayed by a given display device;
selecting a particular style sheet from the at least one obtained style sheet based on the stored output display attributes and the decoded content attributes such that images that are displayed by the connected display device are of a particularly suitable format for the connected display device; and
processing the content data using the particular style sheet for display by the connected display device.

44. The computer-readable medium of claim 43, wherein the content data includes data selected from the group consisting of text data, still picture data, animation data, and voice data.

45. The computer-readable medium of claim 43, wherein the selected style sheet includes scripts that define the format information as a function of the stored display attributes.

46. The computer-readable medium of claim 43, wherein said step of obtaining at least one style sheet includes obtaining a plurality of style sheets, and said step of selecting a particular style sheet includes selecting at least one of the plurality of style sheets.

47. The computer-readable medium of claim 43, wherein said step of obtaining at least one style sheet includes obtaining the at least one style sheet from the digital broadcast signals.

48. The computer-readable medium of claim 43, wherein said step of obtaining at least one style sheet includes obtaining the at least one style sheet from a remotely located server via a network.

49. The computer-readable medium of claim 43, wherein said step of obtaining at least one style sheet includes obtaining the at least one style sheet from a portable recording medium.

50. The computer-readable medium of claim 43, wherein said method further comprises:
combining the visual and audio information and the processed content data for output by the display device.

51. The computer-readable medium of claim 43, wherein the content data includes a data module that is periodically repeated in the content data.

* * * * *

UNITED STATES PATENT AND TRADEMARK OFFICE
CERTIFICATE OF CORRECTION

| | | |
|---|---|---|
| PATENT NO. | : 7,380,206 B1 | Page 1 of 1 |
| APPLICATION NO. | : 09/856039 | |
| DATED | : May 27, 2008 | |
| INVENTOR(S) | : Hiroshi Usuda | |

It is certified that error appears in the above-identified patent and that said Letters Patent is hereby corrected as shown below:

On the title page of the patent in Item (54), "DATA DISTRIBUTION METHOD AND APPARATUS, AND DATA RECEPTION METHOD AND APPARATUS", should read --DATA DISTRIBUTION METHOD AND APPARATUS AND DATA RECEIVING METHOD AND APPARATUS--.

Column 1, line 1, the title of the invention, "DATA DISTRIBUTION METHOD AND APPARATUS, AND DATA RECEPTION METHOD AND APPARATUS", should read --DATA DISTRIBUTION METHOD AND APPARATUS AND DATA RECEIVING METHOD AND APPARATUS--.

Signed and Sealed this

Nineteenth Day of August, 2008

JON W. DUDAS
*Director of the United States Patent and Trademark Office*